US010931855B2

(12) United States Patent
Yoshizumi

(10) Patent No.: US 10,931,855 B2
(45) Date of Patent: Feb. 23, 2021

(54) IMAGING CONTROL BASED ON CHANGE OF CONTROL SETTINGS

(75) Inventor: Shingo Yoshizumi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1130 days.

(21) Appl. No.: 13/008,110

(22) Filed: Jan. 18, 2011

(65) Prior Publication Data

US 2011/0181690 A1 Jul. 28, 2011

(30) Foreign Application Priority Data

Jan. 26, 2010 (JP) ............................ JP2010-014227

(51) Int. Cl.
*H04N 5/232* (2006.01)
*H04N 5/225* (2006.01)

(52) U.S. Cl.
CPC ....... *H04N 5/2252* (2013.01); *H04N 5/23238* (2013.01); *H04N 5/23293* (2013.01); *H04N 5/23299* (2018.08); *H04N 5/232933* (2018.08)

(58) Field of Classification Search
CPC .... H04N 5/23238; H04N 5/2259; H04N 3/02; H04N 7/183; H04N 5/232; H04N 5/2628; G02B 27/642
USPC ....................................................... 348/208.4
See application file for complete search history.

(56) References Cited

U.S. PATENT DOCUMENTS 5,526,045 A * 6/1996 Oshima .............. H04N 5/23248 348/208.2
5,621,491 A * 4/1997 Ohishi ................... G03B 17/00 348/E5.046
5,825,415 A * 10/1998 Kaneda .............. H04N 5/23248 348/208.6
5,894,323 A * 4/1999 Kain ...................... G01C 11/02 348/116
6,237,647 B1 * 5/2001 Pong .................... B67D 7/0401 141/231
6,639,625 B1 * 10/2003 Ishida .................. H04N 1/0402 348/218.1
7,092,012 B2 8/2006 Nakamura et al.
7,221,401 B2 5/2007 Hama et al.
7,436,438 B2 10/2008 Sim et al.
7,627,142 B2 * 12/2009 Kurzweil ................ G06F 3/017 348/62

(Continued)

FOREIGN PATENT DOCUMENTS

CN 1954590 A 4/2007
CN 1979335 A 6/2007

(Continued)

OTHER PUBLICATIONS

Chinese Office Action dated Feb. 8, 2013 in connection with Chinese Application No. 201110025354.8 English translation thereof.

*Primary Examiner* — Patrick E Demosky
(74) *Attorney, Agent, or Firm* — Chip Law Group

(57) ABSTRACT

An imaging control apparatus includes: a control unit controlling a panorama image capturing of an imaging unit imaging a subject; and a setting unit changing control setting of the panorama image capturing between when an imaging unit is in a stable rotation state where the imaging unit is stably rotatable in a substantially horizontal direction and when the imaging unit is in a non-stable rotation state which is not the stable rotation state, as control of the panorama image capturing.

13 Claims, 14 Drawing Sheets

1
31a
2
21a
10
12
11
15

(56) References Cited

U.S. PATENT DOCUMENTS 7,658,557 B2 * 2/2010 Lu .......................... G03B 19/00 348/207.1
8,212,880 B2 * 7/2012 Anderson ............ H04N 5/2252 348/208.7
8,817,134 B2 8/2014 Yoshizumi
2005/0128347 A1 * 6/2005 Ryu ....................... F16M 11/08 348/375
2005/0206778 A1 * 9/2005 Chang .................. H04N 5/2252 348/373
2006/0064273 A1 * 3/2006 Sugiura .................. F16M 11/08 702/145
2006/0077262 A1 4/2006 Miyamaki et al.
2006/0082656 A1 * 4/2006 Ochiai ............... H04N 5/23248 348/207.99
2006/0132604 A1 6/2006 Lao et al.
2006/0238617 A1 * 10/2006 Tamir ............... G08B 13/19606 348/143
2006/0285844 A1 * 12/2006 Hershenzon ........... F16M 13/04 396/421
2007/0098381 A1 * 5/2007 Oshima ................ H04N 3/1575 396/52
2009/0021586 A1 * 1/2009 Yumiki .............. H04N 1/00442 348/207.2
2009/0058990 A1 * 3/2009 Kim ....................... G03B 37/04 348/36
2009/0067826 A1 * 3/2009 Shinohara .............. G03B 17/18 396/50
2009/0103778 A1 * 4/2009 Yoshizumi ......... G06K 9/00221 382/103
2009/0138233 A1 * 5/2009 Kludas ................... G01C 15/00 702/158
2009/0148145 A1 * 6/2009 Harada .................. G03B 17/00 396/55
2009/0148151 A1 * 6/2009 Shi ......................... G03B 15/00 396/428
2009/0244300 A1 * 10/2009 Levin ..................... G03B 17/00 348/208.5
2010/0051774 A1 * 3/2010 Shi ......................... F16M 11/10 248/349.1
2010/0123788 A1 * 5/2010 Shin ................... H04N 5/23248 348/208.11
2010/0134639 A1 * 6/2010 Takeuchi ............. G02B 27/646 348/208.4
2010/0295966 A1 11/2010 Furlan
2011/0164870 A1 * 7/2011 Manson ................. F16M 11/14 396/428
2011/0181687 A1 7/2011 Yoshizumi
2011/0216159 A1 9/2011 Yoshizumi
2011/0216225 A1 9/2011 Yoshizumi
2012/0002075 A1 1/2012 Yoshizumi et al.

FOREIGN PATENT DOCUMENTS

CN 101046623 A * 10/2007 ............. G03B 37/02
CN 101415077 A 4/2009
JP 11-088754 3/1999
JP 11-088811 3/1999
JP 2005-333396 A 12/2005
JP 2008219369 A * 9/2008
JP 2009-100300 A 5/2009
KR 100736565 B1 6/2007
WO WO 2005/088961 A1 9/2005

* cited by examiner

1
OPTICAL SYSTEM UNIT
21
IMAGE SENSOR
22
A/D
23
SIGNAL PROCESSING UNIT
24
ENCODING/ DECODING UNIT
25
MEDIA CONTROLLER
26
MEMORY CARD
40
CONTROL UNIT (CPU)
27
DISPLAY DRIVER
32
DISPLAY UNIT
33
OPERATION UNIT
31
MOVEMENT DETECTION UNIT
35
ROM
28
RAM
29
FLASH MEMORY
30
PAN/TILT HEAD CORRESPONDENCE COMMUNICATION UNIT
34
PAN/TILT HEAD
10 t-Vin
t-Video
61
POWER CIRCUIT
TO EACH UNIT
59
CONNECTION DETECTION UNIT
56a
57
56
TILT MECHANISM UNIT
RE
TILT MOTOR
58
TILT DRIVING UNIT
53a
PAN MECHANISM UNIT
RE
PAN MOTOR
PAN DRIVING UNIT
CONTROL UNIT
51
53
54
55
COMMUNICATION UNIT
52
OPERATION UNIT
60
10
DIGITAL STILL CAMERA
1

IMAGING CONTROL BASED ON CHANGE OF CONTROL SETTINGS

BACKGROUND OF THE INVENTION

1. Field of the Invention

The present invention relates to an imaging control apparatus, an imaging apparatus capable of capturing a panorama image, an imaging control method for the imaging apparatus, and a program.

2. Description of the Related Art

In the related art, so-called panorama image capturing is disclosed by which a still image of a wide angle scene is obtained when a user (cameraman) takes a photograph of the image while moving a camera in a substantially horizontal rotation direction. For example, Japanese Unexamined Patent Application Publication No. 11-88754, Japanese Unexamined Patent Application Publication No. 11-88811, and Japanese Unexamined Patent Application Publication No. 2005-333396 disclose the techniques regarding the panorama image capturing.

When performing imaging with a digital still camera in a panorama image capturing mode, a user moves the camera in the substantially horizontal rotation direction. At this time, the digital still camera acquires many pieces of still image data and synthesizes the still images at the joins of the subject scene to generate panorama image data as horizontally long still image.

By the panorama image capturing, a wide-angle scene which may not be obtained in normal image capturing can be obtained as one still image.

SUMMARY OF THE INVENTION

However, when the panorama image capturing is performed, the user has to do his best to rotatably move the camera horizontally in the imaging direction without causing upper and lower blurs. This is because a plurality (plural frames) of still image data is appropriately synthesized at each angle position at which the still images are captured.

However, when a person takes a photograph of the panorama image holding the camera with his hands, it is difficult to perform the panorama image capturing without causing complete blurring in the vertical direction.

Therefore, various kinds of restrictions are imposed to enable high equality synthesis of the still image data.

For example, it is not appropriate that an angle range of the panorama image capturing is set to 360°. This is because it is difficult for the user to rotate the camera horizontally (movement of camera in a subject direction) by 360° without causing upper and lower blurs, the joins from the captured-image frame at 0° to the captured-image frame at 360° do not match with each other, and an image obtained through the synthesis result of the joins may consequently become rough or disordered.

Accordingly, the angle range for the imaging is restricted to, for example, 180° or 270°.

A movement speed of the camera in the imaging direction is restricted within a predetermined range. This is because when the user rotates the camera too slowly, hand blur becomes poor and thus the frame images may not be synthesized. When the movement speed is too fast, blurring occurs in the captured-image due to the relationship between the movement speed and a shutter speed (exposure time of one frame).

Accordingly, measures are taken to solve the problems, for example, by setting a speed range so that an error occurs in the imaging operation when the movement speed is not within the set speed range.

For example, since it is necessary to synthesize the frame image data captured at each position during the horizontal rotational movement in the panorama image capturing, the angle range or the speed range is restricted in order to perform the synthesis process appropriately.

However, more various types of panorama image capturing may be limited due to the restriction. For instance, when panorama image capturing of a night scene is performed, it is necessary to rotatably move the camera (subject direction) slowly to some degree. However, when the camera is moved slowly, an error may occur due to the restriction on, for example, the speed range and thus the panorama image capturing may not be performed.

It is desirable to provide a technique capable of changing control setting for panorama image capturing depending on the situation and performing various kinds of panorama image capturing while maintaining the quality of a panorama image.

According to an embodiment of the invention, there is provided an imaging control apparatus including: a control unit controlling a panorama image capturing of an imaging unit imaging a subject; and a setting unit changing control setting of the panorama image capturing between when an imaging unit is in a stable rotation state where the imaging unit is stably rotatable in a substantially horizontal direction and when the imaging unit is in a non-stable rotation state which is not the stable rotation state, as control of the panorama image capturing.

For example, as one of the control settings, the setting unit may set an angle range in which the panorama image capturing is performed, in the non-stable rotation state, the angle range is restricted within a predetermined angle range, and in the stable rotation state, the angle range is allowed to be wider than the predetermined angle range of the non-stable rotation state or is allowed to be unlimited.

As one of the control settings, the setting unit may set an allowable speed range in the panorama image capturing, in the non-stable rotation state, the allowable speed range is restricted within a predetermined speed range, and in the stable rotation state, the allowable speed range is allowed to be wider than the predetermined speed range of the non-stable rotation state or the restriction on the speed range is cancelled.

As one of the control settings, the setting unit may set a zoom in the panorama image capturing, in the non-stable rotation state, zooming is prohibited or restricted within a predetermined zoom range, and in the stable rotation state, zooming is permitted or a zoom range wider than the predetermined zoom range of the non-stable rotation state is allowed.

As one of the control settings, the setting unit may set a resolution in the panorama image capturing, in the non-stable rotation state, the resolution is restricted to a predetermined value, and in the stable rotation state, a resolution higher than the resolution of the non-stable rotation state is allowed or the restriction on the resolution is cancelled.

The imaging control apparatus may further include: a stable rotation state detection unit detecting whether the imaging unit is in the stable rotation state where the imaging unit is stably rotatable in a substantially horizontal direction.

The stable rotation state detection unit may detect whether the imaging unit is mounted on a rotatable stand holding the imaging unit so as to be rotatable in the substantially horizontal direction, and detects the stable rotation state when the imaging unit is mounted on the rotatable stand.

The stable rotation state detection unit may communicate with the rotatable stand on which the imaging unit is mounted, and may detect the stable rotation state when detecting a predetermined type of rotatable stand.

The stable rotation state detection unit may detect whether a main body of the imaging control apparatus is in the stable rotation state based on a movement amount of the main body of the imaging control apparatus in a substantially vertical direction when the main body of the imaging control apparatus moves in the substantially horizontal direction.

The imaging control apparatus may further include a recording unit recording image data acquired by the imaging of the imaging unit in a recording medium.

As the control of the panorama image capturing, the control unit may allow the imaging unit to acquire a plurality of the image data by the imaging and generate panorama image data using the plurality of image data.

According to another embodiment of the invention, there is provided an imaging apparatus including: an imaging unit imaging a subject; and a control unit changing control setting of panorama image capturing between when a main body of the imaging apparatus is in a stable rotation state where the main body of the imaging apparatus is stably rotatable in a substantially horizontal direction and when the main body of the imaging apparatus is in a non-stable rotation state which is not the stable rotation state, as control of the panorama image capturing.

According to still another embodiment of the invention, there is provided an imaging control method including the steps of: detecting whether an imaging unit is in a stable rotation state where the imaging unit is stably rotatable in a substantially horizontal direction; changing control setting of panorama image capturing between when the imaging unit is in the stable rotation state and when the imaging unit is in a non-stable rotation state which is not the stable rotation state; and acquiring a plurality of image data by imaging and generating panorama image data using the plurality of image data, as control of the panorama image capturing based on the control setting.

According to still another embodiment of the invention, there is provided a program for control processing of an imaging control apparatus. The program causes an arithmetic processing unit to execute the above steps.

According to the embodiments of the invention, it is first determined whether the main body of the imaging apparatus is in the stable rotation state. The stable rotation state refers to a state where there is almost no blurring in the substantially vertical direction when a subject is rotatably moved in the substantially horizontal direction. For example, the stable rotation state refers to a state where the imaging apparatus is mounted on a rotatable stand such as a predetermined pan/tilt head so as to be rotated. On the other hand, a state where the user holds the imaging apparatus with his hands is a non-stable rotation state.

In the stable rotation state, the blurs in the vertical direction at the movement time of the subject direction may not be taken into consideration. That is, various restrictions may not be imposed as the control settings in consideration of the blurs in the vertical direction.

From this point of view, the control setting (for example, a parameter or a processing algorithm) is changed depending on whether the imaging apparatus is in the stable rotation state. For example, in the stable rotation state, the range such as the angle range or the movement speed is restricted or the restriction thereon is cancelled.

According to the embodiments of the invention, the control settings are different in the non-stable rotation state such as a state where the panorama image capturing is performed in hand and in the stable rotation state. Specifically, in the stable rotation state, the range such as the angle range or the movement speed is restricted or the restriction thereon is cancelled. Thus, it is possible to obtain the advantage of performing various kinds of panorama image capturing while acquiring high-quality panorama images.

DESCRIPTION OF THE PREFERRED EMBODIMENTS

Figure 1A:
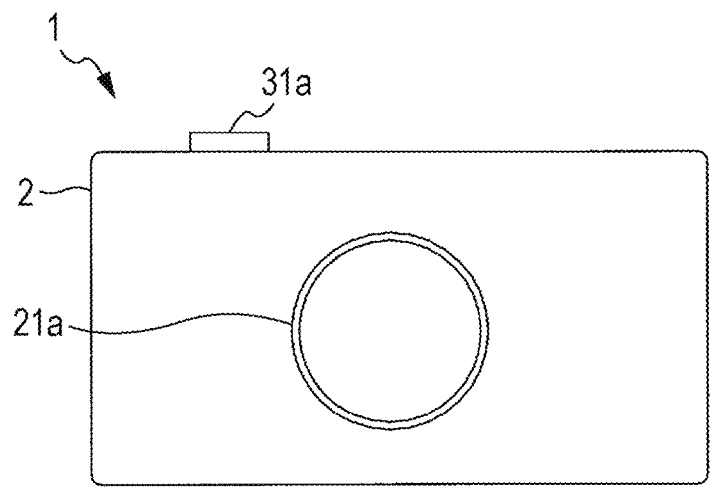
FIGS. 1A and 1B are a front view and a rear view illustrating a digital still camera according to an embodiment of the invention, respectively.

Hereinafter, embodiments of the invention will be described in the following order. In the embodiments, an imaging system including a digital still camera and a pan/tilt head capable of mounting the digital still camera will be described as an example. A single digital still camera can, of course, capture an image, but an imaging process can be performed by the imaging system in combination with the pan/tilt head.

1. Configuration of Imaging System
1-1. General Configuration
1-2. Digital Still Camera
1-3. Pan/tilt Head
2. Exemplary Function Configuration
3. Automatic Still Image Capturing Mode Process
4. Panorama Image Capturing Mode Process 5. Various Modified Examples 6. Program In the specification, an "image frame", an "image angle", an "imaging visual field", and a "composition" used in description are defined as follows.

The "image frame" refers to an area range corresponding to one image plane viewed, for example, just as an image is inserted, and generally has a vertically long rectangular outer line form or a horizontally long rectangular outer line form.

The "image angle", which is also referred to as a zoom angle, is obtained by expressing a range, which falls within the image frame determined according to the position of a zoom lens of an optical system of an imaging apparatus, by an angle. In general, the image angle is determined according to a size between the focal distance of an imaging optical system and an image plane (an image sensor or a film). However, an element which can be varied in response to a focal distance is referred to as the image angle.

The "imaging visual field" indicates a visual field by the imaging optical system. That is, the imaging visual field is a range which falls within the image frame of an imaging target in the surrounding scene of the imaging apparatus. The imaging visual field is determined by a swing angle in a pan (horizontal) direction and an angular degree (an elevation angle and a depression angle) in a tilt (vertical) direction as well as the image angle.

The "composition", which is also referred to as framing, is a disposition state after the inclusion of the setting of the size of a subject falling within the image frame determined by, for example, the imaging visual field.

1. CONFIGURATION OF IMAGING SYSTEM

1-1. General Configuration

An imaging system according to an embodiment includes a digital still camera 1 and a pan/tilt head 10 on which the digital still camera 1 is detachably mounted.

In the pan/tilt head 10, the orientation of pan/tilt directions of the digital still camera 1 is electrically varied. Then, automatic composition adjustment and automatic recording of a captured image obtained by the automatic composition adjustment are performed.

For example, a search is performed for a subject as a person using a face detection technology. Specifically, the subject (the face of a person) viewed within the image frame is detected while the digital still camera 1 is rotated, for example, in the pan direction by the pan/tilt head 10.

When the subject is detected within the image frame as the result of the search for the subject, the composition considered to be optimum for the detected form (for example, the number, position, or size of the subject) of the subject within the image frame upon detecting the subject is determined (optimum composition determination). That is, the angles of the pan, tilt, and zoom considered to be optimum are calculated.

When the angles of the pan, tilt, and zoom considered to be optimum are calculated by the optimum composition determination, the angles of the pan, tilt, and zoom are adjusted as target angles (composition adjustment).

After the composition adjustment is completed, the captured image is automatically recorded.

According to the automatic imaging process of the automatic composition adjustment (automatic captured-image recording), the captured image can be recorded automatically using the composition considered to be optimum with no imaging operation performed by the user.

Figure 1B:
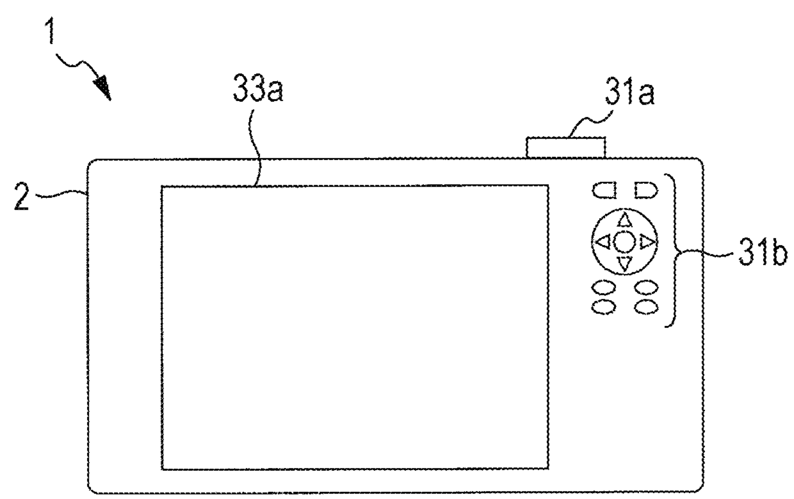

In FIGS. 1A and 1B, the example of appearance of the digital still camera 1 is shown. FIGS. 1A and 1B are front and rear views illustrating the digital still camera 1, respectively.

As shown in FIG. 1A, the digital still camera 1 includes a lens unit 21*a* on the front surface of a main body 2 thereof. As an optical system capturing an image, the lens unit 21*a* is formed in the outside of the main body 2.

A release button 31*a* is installed on the upper surface of the main body 2. In an image capturing mode, an image (captured image) captured by the lens unit 21*a* is generated as an image signal. In the image capturing mode, captured-image data of each frame can be obtained at a predetermined frame rate by an image sensor described below.

When the release button 31*a* is operated (release operation/shutter operation), the captured image (frame image) is recorded as image data of a still image at this timing in a recording medium. That is, capturing the still image, which is generally called photography, is performed.

As shown in FIG. 1B, the digital still camera 1 includes a display screen unit 33*a* on the rear surface thereof.

In the image capturing mode, an image captured by the lens unit 21*a* is displayed as a through image on the display screen unit 33*a*. The through image is a moving image based on each frame image obtained by the image sensor and is an image displayed as the subject is displayed at that time.

In a reproduction mode, the image data recorded in the recording medium is reproduced and displayed.

The operated image is displayed as a GUI (Graphical User Interface) in response to the operation performed with the digital still camera 1 by the user.

By combining a touch panel with the display screen unit 33*a*, a necessary operation can be performed when the user touches on the display screen unit 33*a* with his fingers on the display screen unit 33*a*.

The digital still camera 1 includes an operator 31*b* such as various keys and a dial as well as the release button 31*a*.

Operation keys, an operation dial, or the like for a zoom operation, mode selection, a menu operation, a cursor operation on a menu, a reproduction operation, and the like can be exemplified.

Figure 2:
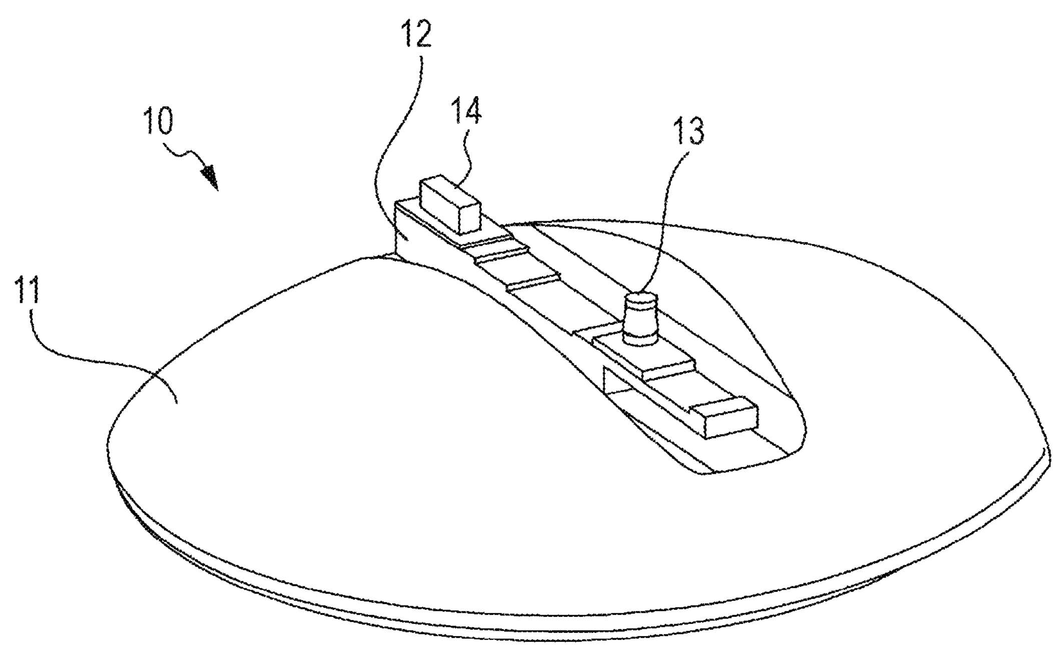
FIG. 2 is a perspective view illustrating a pan/tilt head on which the digital still camera is mounted according to the embodiment.
Figure 3:
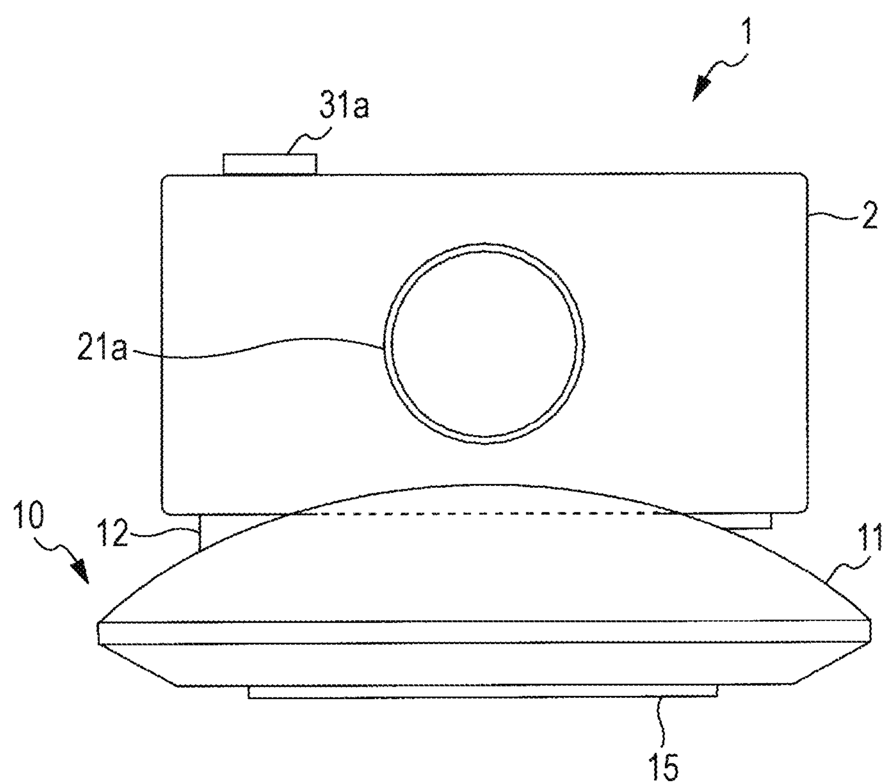
FIG. 3 is a front view illustrating the pan/tilt head mounted with the digital still camera according to the embodiment.
Figure 4:
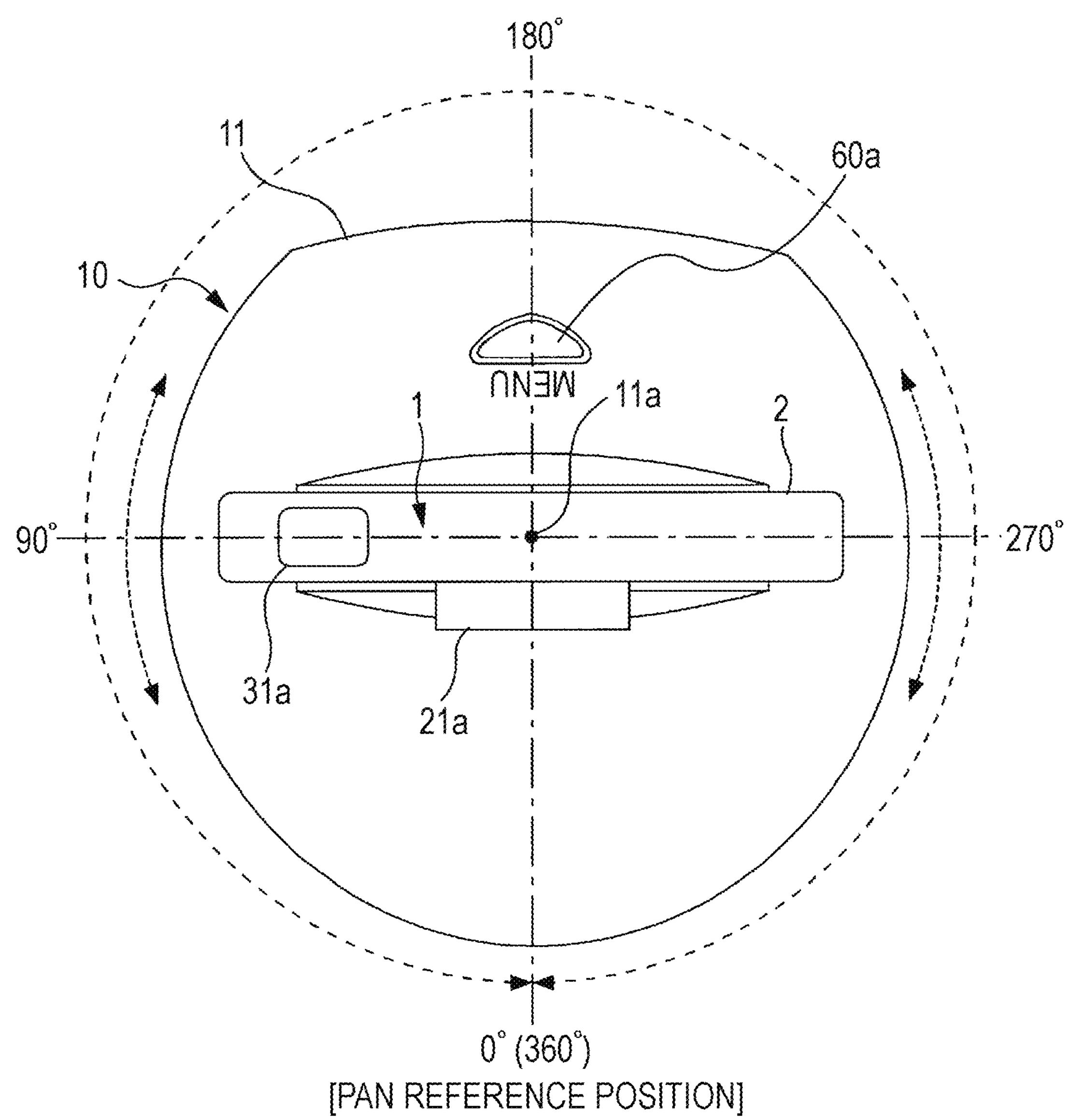
FIG. 4 is a diagram illustrating movement in a pan direction when the digital still camera is mounted on the pan/tilt head according to the embodiment.
Figure 5A:
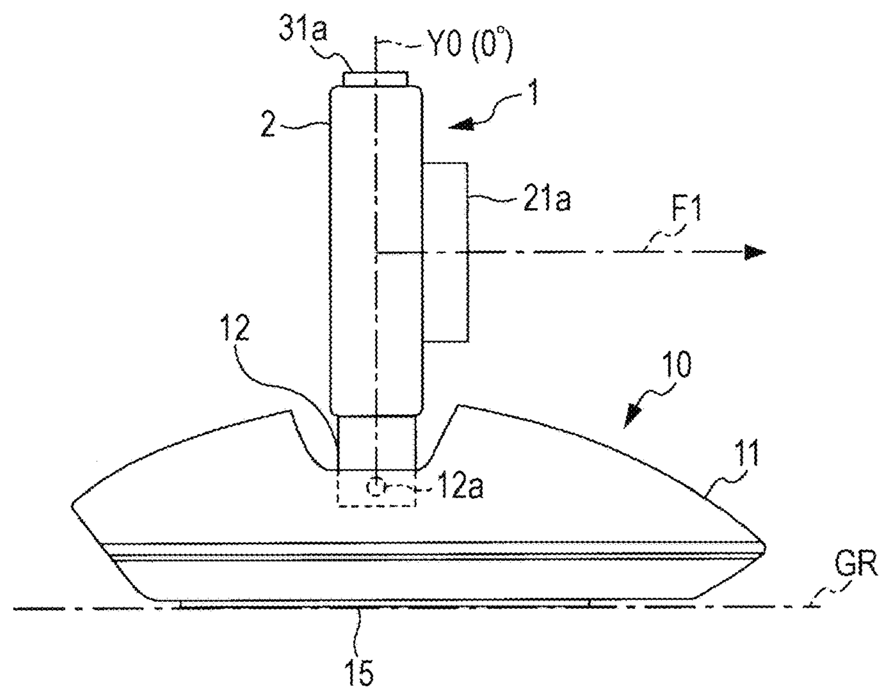
FIGS. 5A and 5B are diagrams illustrating movement in a tilt direction when the digital still camera is mounted on the pan/tilt head according to the embodiment.
Figure 5B:
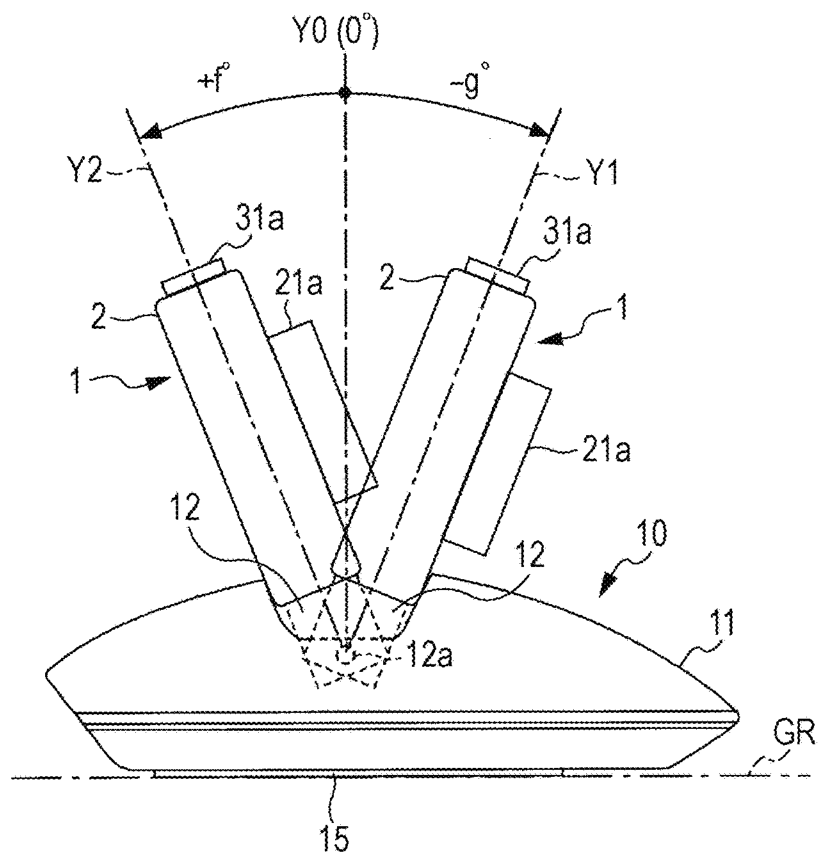

FIG. 2 is a perspective view illustrating the appearance of the pan/tilt head 10. In FIG. 3 to FIG. 5B, the state where the digital still camera 1 is appropriately placed on the pan/tilt head 10 is shown. FIG. 3 is a front view, FIG. 4 is a plan view, and FIGS. 5A and 5B are side views (in particular, FIG. 5B is a side view illustrating the movement range of a tilt mechanism).

As FIGS. 2, 3, 4, 5A, and 5B are shown, the pan/tilt head 10 has a structure in which a main body 11 is combined on a large grounding base 15 and a camera pedestal unit 12 is mounted on the main body 11.

When the digital still camera 1 is mounted on the pan/tilt head 10, the bottom surface of the digital still camera 1 is placed on the top surface of the camera pedestal unit 12.

As shown in FIG. 2, a protrusion portion 13 and a connector 14 are formed on the top surface of the camera pedestal unit 12. Although not shown, a hole portion engaging with the protrusion portion 13 is formed on the lower surface of the main body 2 of the digital still camera 1. When the digital still camera 1 is appropriately placed on the camera pedestal unit 12, the hole portion and the protrusion portion 13 engage with each other. In the engagement state, it is assumed that the digital still camera 1 is not deviated from the pan/tilt head 10 in normal panning and tilting processes of the pan/tilt head 10.

A connector is also formed at a predetermined position on the bottom surface of the digital still camera 1. When the digital still camera 1 is appropriately mounted on the camera pedestal unit 12, as described above, the connector of the digital still camera 1 is connected to the connector 14 of the pan/tilt head 10 so that at least the both are communicable with each other.

For example, the connector 14 and the protrusion portion 13 are actually configured so that the position thereof shifts (moves) relative to the camera pedestal unit 12 within a given range. Moreover, for example, when an adapter or the like suitable for the shape of the bottom surface of the digital still camera 1 is concurrently used, another kind of digital still camera is configured to be mounted on the camera pedestal unit 12 so as to communicate with the pan/tilt head 10.

Next, basic movement of the digital still camera 1 by the pan/tilt head 10 in the pan and tilt directions will be described.

First, the basic movement in the pan direction is as follows.

That is, the bottom surface of the grounding base 15 is grounded in the state where the pan/tilt head 10 is put on the surface of a table, a floor, or the like. In this state, as shown in FIG. 4, the main body 11 is configured to rotate clockwise or counterclockwise about a rotational axis 11*a* which is a rotational center. That is, when the main body 11 rotates, the imaging visual field can be varied in a horizontal direction (right and left directions) of the digital still camera 1 mounted on the pan/tilt head 10 (so-called panning).

In this case, a pan mechanism of the pan/tilt head 10 is configured so as to rotate by 360° or more clockwise or counterclockwise without limitation.

A reference position in the pan direction is set for the pan mechanism of the pan/tilt head 10.

Here, as shown in FIG. 4, a pan reference position is set to be 0° (360°) and the rotation position of the main body 11 in the pan direction, that is, the pan position (pan angle) is set to be within a range from 0° to 360°.

The basic movement of the pan/tilt head 10 in the tilt direction is as follows.

That is, as shown in FIGS. 5A and 5B, the movement in the tilt direction is achieved by swinging the camera pedestal unit 12 about a rotational axis 12*a* serving as a rotational center at an angle in both directions of the elevation angle and the depression angle.

As shown in FIG. 5A, the camera pedestal unit 12 is located at a tilt reference position Y0 (0°). In this state, an imaging direction F1 identical with the imaging optical axis of the lens unit 21*a* (optical system) is parallel to a grounding surface GR on which the grounding base 15 is grounded.

As shown in FIG. 5B, the camera pedestal unit 12 can move about the rotational axis 12*a* serving as the rotational center in the direction of the elevation angle within the range from the tilt reference position Y0 (0°) to the predetermined maximum rotation angle +f°. The camera pedestal unit 12 can also move the rotational axis 12*a* serving as the rotational center in the direction of the depression angle within the range from the tilt reference position Y0 (0°) to the predetermined maximum rotation angle −g°.

Thus, by moving the camera pedestal unit 12 within the range from the maximum rotation angle +f° to the maximum rotation angle −g° with reference to the tilt reference position Y0 (0°), the imaging visual field can be varied in the tilt direction (upper and lower directions) of the digital still camera 1 mounted on the pan/tilt head 10 (the camera pedestal unit 12). That is, the tilting process can be achieved.

Figure 6:
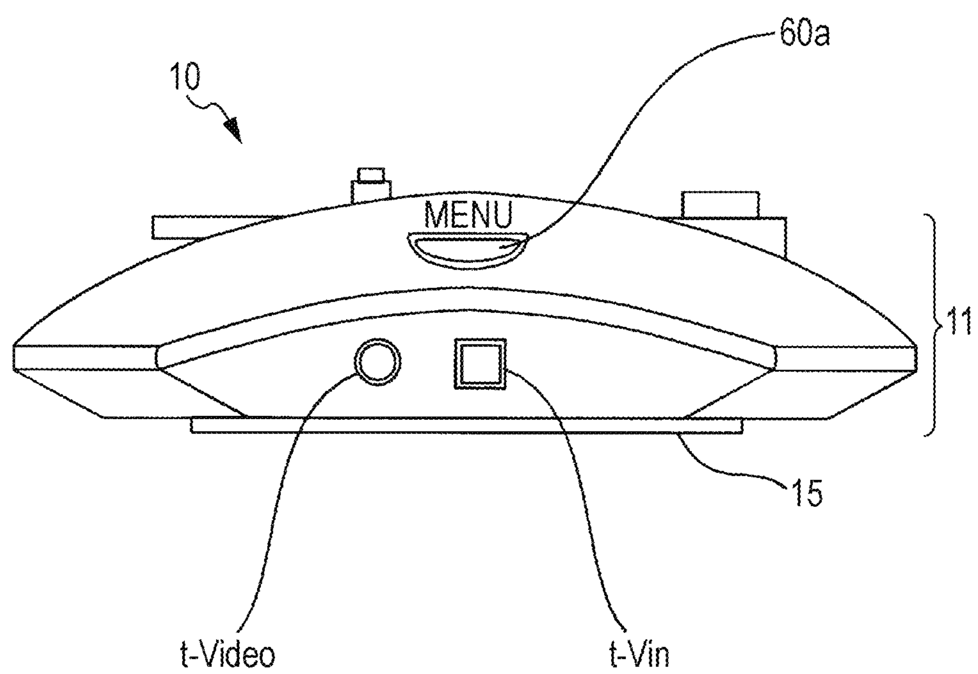
FIG. 6 is a rear view illustrating the pan/tilt head according to the embodiment.

FIG. 6 is a rear view illustrating the pan/tilt head 10.

As shown in FIG. 6, the pan/tilt head 10 has a power terminal t-Vin detachably connecting a power cable and a video terminal t-Video detachably connecting a video cable on the rear surface of the main body 11.

The pan/tilt head 10 is configured to charge the digital still camera 1 by supplying power input via the power terminal t-Vin to the digital still camera 1 mounted on the above-described camera pedestal unit 12.

That is, the pan/tilt head 10 of this example functions as a cradle (dock) charging the digital still camera 1.

In this example, when an image signal based on, for example, a captured image is transmitted from the digital still camera 1, the pan/tilt head 10 is configured to output the image signal to the outside via the video terminal t-Video.

As shown in FIGS. 4 and 6, a menu button 60*a* is installed on the rear surface of the main body 11 of the pan/tilt head 10. By operating the menu button 60*a*, for example, a menu is displayed on the display screen unit 33*a* of the digital still camera 1 by communication between the pan/tilt head 10 and the digital still camera 1. When the menu is displayed, the user can operate a necessary operation.

1-2. Digital Still Camera

Figure 7:
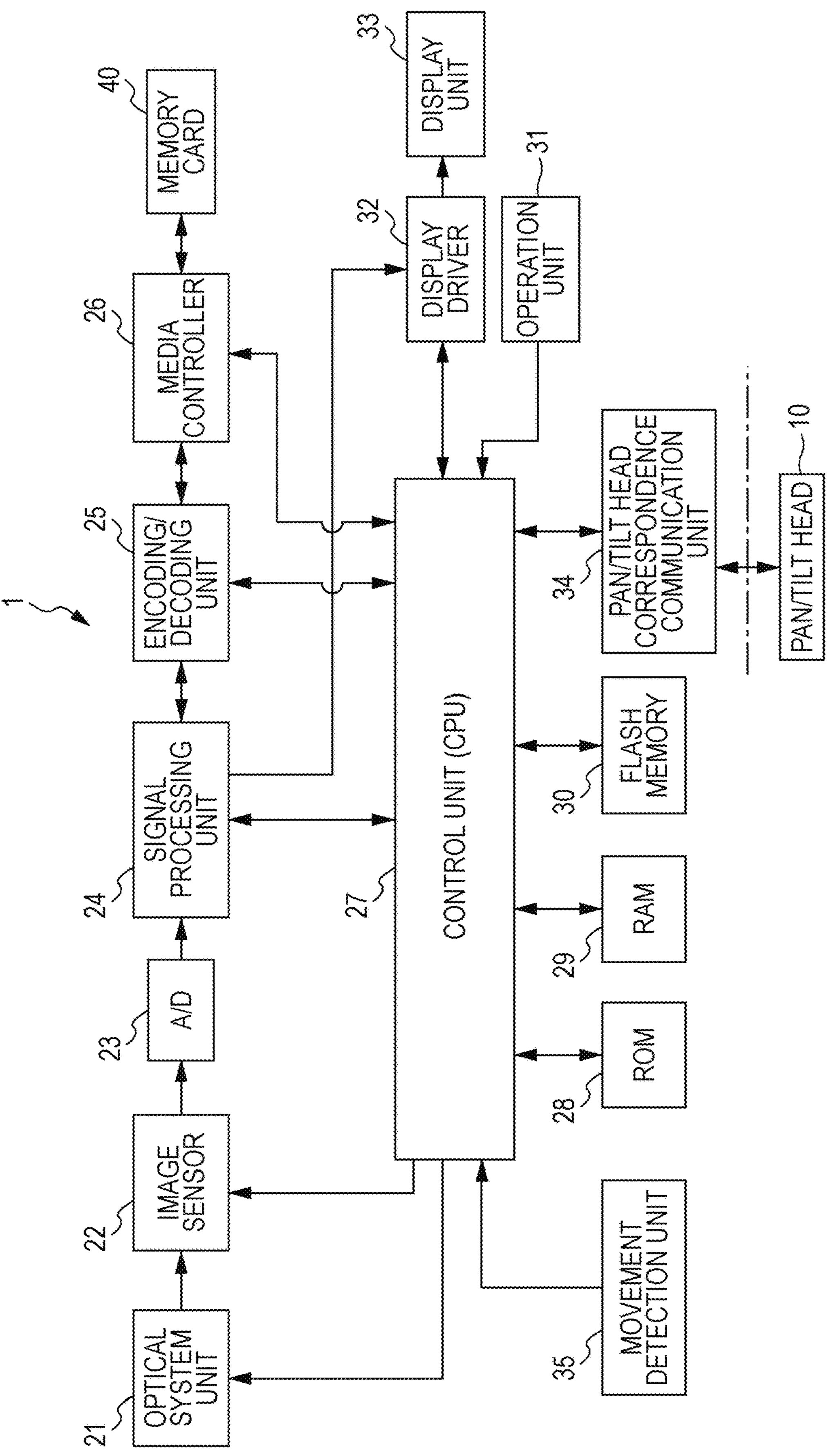
FIG. 7 is a block diagram illustrating an exemplary internal configuration of the digital still camera according to the embodiment.

FIG. 7 is a block diagram illustrating an exemplary internal configuration of the digital still camera 1.

The optical system unit 21 includes a diaphragm and a lens group with the predetermined number of imaging lenses including a zoom lens and a focus lens. The optical system unit 21 forms an image on a light-receiving surface of the image sensor 22 using incident light as imaging light.

The optical system unit 21 may include a driving mechanism to drive the zoom lens, the focus lens, the diaphragm, and the like. The process of the driving mechanism is controlled by so-called camera control such as zoom (image angle) control, automatic focus adjustment control, and automatic exposure control performed by, for example, a control unit 27.

The image sensor 22 performs so-called photoelectric conversion to convert imaging light obtained from the optical system unit 21 into an electric signal. Therefore, the image sensor 22 receives the imaging light from the optical system unit 21 on the light-receiving surface of a photoelectric conversion element and sequentially outputs signal charges accumulated in response to the strength of the received light at a predetermined timing. Thus, the electric signal (imaging signal) corresponding to the imaging light is output.

The photoelectric conversion element (imaging element) used as the image sensor 22 is not particularly limited. In this situation, however, a CMOS (Complementary Metal Oxide Semiconductor) sensor, a CCD (Charge Coupled Device), or the like may be used. When the CMOS sensor is used, a configuration also including an analog-digital converter corresponding to an A/D converter 23 described below may be used as a device (component) corresponding to the image sensor 22.

When the imaging signal output from the image sensor 22 is input to the A/D converter 23, the imaging signal is converted into a digital signal and is input to a signal processing unit 24.

The signal processing unit 24 is configured by, for example, a DSP (Digital Signal Processor) and performs predetermined signal processing on the digital imaging signal output from the A/D converter 23 according to a program.

The signal processing unit 24 acquires the digital imaging signal output from the A/D converter 23 by unit corresponding to one still image (frame image). The signal processing unit 24 generates captured-image data (captured still image data), which is image signal data corresponding to one still image, by performing predetermined signal processing on the imaging signal of the acquired still image unit.

In some cases, the signal processing unit 24 performs an image analysis process for performing a subject detection process or a composition process described below using the captured-image data acquired in this manner.

In a panorama image capturing mode, the signal processing unit 24 also performs a process of synthesizing many frame images obtained in panorama image capturing and generates panorama image data.

When the captured-image data generated by the signal processing unit 24 is recorded in a memory card 40 serving as a recording medium, the captured-image data corresponding to, for example, one still image is output from the signal processing unit 24 to the encoding/decoding unit 25.

The encoding/decoding unit 25 performs compression encoding on the captured-image data of the still image unit output from the signal processing unit 24 according to a predetermined still image compression encoding scheme, and performs conversion into a format of the image data compressed according to a predetermined format by adding a header or the like under the control of the control unit 27, for example. Then, the image data generated in this manner is transmitted to the media controller 26.

The media controller 26 writes and records the transmitted image data in the memory card 40 under the control of the control unit 27. In this case, the memory card 40 is a recording medium which has an outer appearance of a card form in conformity to a predetermined standard, for example, and has a non-volatile semiconductor storage element such as a flash memory therein.

The recording medium recording the image data may be a recording medium of another kind or form other than the memory card. For example, various recording media such as an optical disk, a hard disk, a semiconductor memory chip such as a flash memory chip mounted in a non-detachable manner, and a holographic memory may be used.

The digital still camera 1 can display a so-called through image, which is an image currently being captured, by displaying the image on the display unit 33 using the captured-image data obtained from the signal processing unit 24.

For example, the signal processing unit 24 generates the captured-image data corresponding to one still image by importing the imaging signal output from the A/D converter 23, as described above, and sequentially generates the captured-image data corresponding to a frame image in a moving image by repeatedly generating the captured-image data. Then, the sequentially generated captured-image data are transmitted to the display driver 32 under the control of the control unit 27.

The display driver 32 generates driving signals to drive the display unit 33 based on the captured-image data input from the signal processing unit 24, as described above, and outputs the driving signals to the display unit 33. Accordingly, the images based on the captured-image data of the still image unit are sequentially displayed on the display unit 33.

In terms of a user's view, the captured images are displayed on the display unit 33 just as a moving image is displayed. That is, the trough image is displayed.

The digital still camera 1 can reproduce the image data recorded in the memory card 40 and display the images on the display unit 33.

Therefore, the control unit 27 designates the image data and instructs the media controller 26 to read data from the memory card 40. In response to this command, the media controller 26 gains access to the address where the designated image data is recorded on the memory card 40, reads the image data, and transmits the read image data to the encoding/decoding unit 25.

The encoding/decoding unit 25 starts extracting the substantial data as the compressed still image data from the captured-image data transmitted from the media controller 26 under the control of the control unit 27, for example, and performs a decoding process for the compression encoding on the compressed still image data to obtain the captured-image data corresponding to one still image. The captured-image data is transmitted to the display driver 32. Thus, the images of the captured-image data recorded in the memory card 40 are reproduced and displayed on the display unit 33.

Not only the through image or the reproduced images of the image data but also a user interface image (operated image) can be displayed on the display unit 33.

In this case, a display image data serving as the user interface image necessary in the control unit 27 is generated, for example, according to the process state, and the display image data is output to the display driver 32. Thus, the user interface image is displayed on the display unit 33.

The user interface image can be displayed on the display screen of the display unit 33 independent of a monitor image such as a specific menu screen or the reproduced image of the captured-image data. Therefore, the user interface image can be displayed in a superimposed or synthesized manner on the monitor image or the reproduced image of the captured-image data.

The control unit 27 includes a CPU (Central Processing Unit), and thus forms a microcomputer together with a ROM 28, a RAM 29, and the like.

The ROM 28 stores programs to be executed by the CPU, for example, serving as the control unit 27 and various kinds of setting information associated with the process of the digital still camera 1.

The RAM 29 is a main memory unit for the CPU.

In this case, the flash memory 30 is used as a non-volatile storage area used to store various kinds of setting information and the like necessary to be modified (rewritten) according to the operation of the user, an process history, or the like.

When a non-volatile memory including, for example, a flash memory is used in the ROM 28, a partial storage area of the ROM 28 may be used instead of the flash memory 30.

In this embodiment, the control unit 27 performs various imaging preparation processes for automatic imaging.

First, the control unit 27 performs, as a subject detection process, a process of detecting a subject from each frame image obtained by the signal processing unit 24 while varying the imaging visual field (or allowing the signal processing unit 24 to perform the process) and searching for a surrounding subject from the digital still camera 1.

As the composition process, the control unit 27 performs optimum composition determination of determining the composition considered to be optimum for the form of the subject detected in the subject detection process according to a predetermined algorithm and composition adjustment of setting the composition considered to be optimum by the optimum composition determination as a target composition. After the imaging preparation process, the control unit 27 performs control processes to record the captured-images automatically.

The control unit 27 performs a panorama image capturing process, that is, gives an instruction to perform capturing many frame images as panorama image capturing or to perform a synthesis process or performs a process such as parameter setting in the panorama image capturing mode. The control unit 27 also controls the pan/tilt head 10 to rotatably move the pan/tilt head 10 in a substantially horizontal direction for the panorama image capturing, when the digital still camera 1 is mounted on the pan/tilt head 10.

This control process will be described below.

The operation unit 31 collectively refers to various operators equipped with the digital still camera 1 and an operation information signal output unit which generates operation information signals in response to the operation performed in the operator and outputs the operation information signals to the control unit 27.

Examples of the operator include the release button 31*a* and the various operators 31*b* (such as a power button, a mode button, a zoom operation button, and an operation dial) shown in FIGS. 1A and 1B.

When the display unit 33 is formed as a touch panel, the touch sensor unit may be a specific example of the operation unit 31.

Moreover, a reception unit receiving a command signal from a remote controller is an example of the operation unit 31.

The control unit 27 performs a predetermined process in response to the operation information signal input from the operation unit 31. Thus, the process of the digital still camera 1 is implemented according to the operation of the user.

A pan/tilt head correspondence communication unit 34 is a unit which executes communication according to a predetermined communication scheme between the pan/tilt head 10 and the digital still camera 1.

For example, when the digital still camera 1 is mounted on the pan/tilt head 10, the pan/tilt head correspondence communication unit 34 has a physical layer configuration in which communication signals can be transmitted to and received from a communication unit of the pan/tilt head 10 and a configuration in which a communication process corresponding to a predetermined upper layer of the physical layer is implemented. In the physical layer configuration, a connector unit connected to the connector 14 is included in correspondence to the configuration of FIG. 2.

Both a terminal exchanging the communication signals and a terminal transmitting charging power are installed in each connector to enable charging on the side of the pan/tilt head 10. Although not illustrated, a battery mounting unit detachably mounting a battery is installed in the digital still camera 1. Therefore, the battery mounted in the battery mounting unit is charged with electricity based on the power transmitted from the pan/tilt head 10.

A movement detection unit 35 is a sensor unit which detects a movement status of the main body of the digital still camera 1. For example, an acceleration sensor, an angular velocity sensor, or a gyro sensor is installed.

In the panorama image capturing, the movement speed of the digital still camera 1 may be restricted. The movement speed of the digital still camera 1 is detected by the movement detection unit 35 and is supplied to the control unit 27. Thus, the control unit 27 can determine whether the movement speed falls within the restriction range. An angle range in the panorama image capturing can be calculated from the movement speed and time.

1-3. Pan/Tilt Head

Figure 8:
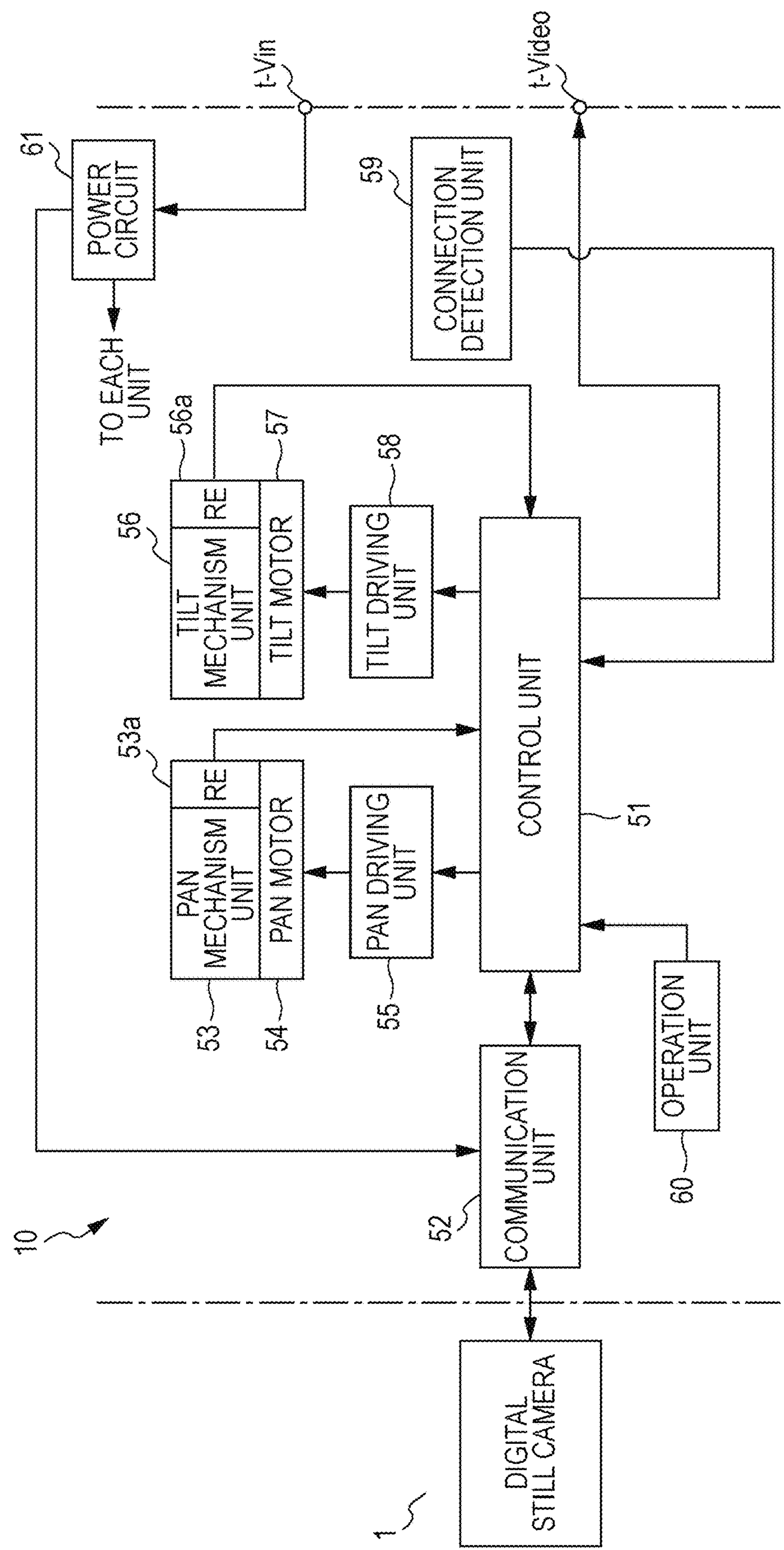
FIG. 8 is a block diagram illustrating an exemplary internal configuration of the pan/tilt head according to the embodiment.

FIG. 8 is a block diagram illustrating an exemplary internal configuration of the pan/tilt head 10.

As described above with reference to FIG. 6, the power terminal t-Vin and the video terminal t-Video are installed in the pan/tilt head 10.

The power input via the power terminal t-Vin is supplied as process power necessary for each unit of the pan/tilt head 10 via a power circuit 61. Charging power for the digital still camera 1 is generated for the power circuit 61 and the charging power is supplied to the digital still camera 1 via a communication unit 52 (connector).

A video signal transmitted from the digital still camera 1 is supplied to the video terminal t-Video via the communication unit 52→ a control unit 51.

Here, the process power of each unit of the pan/tilt head 10 is supplied via the power terminal t-Vin. However, in effect, a mounting unit of a battery is installed in the pan/tilt head 10 so that the process power of each unit can be supplied from the battery mounted on the mounting unit.

A connection detection unit 59 detecting whether cables to the power terminal t-Vin and the video terminal t-Video are connected is installed in the pan/tilt head 10. As a specific configuration of a detection mechanism detecting whether the cable is connected, a configuration or the like in which a switch turns ON/OFF in response to the connection/non-connection of the cables is exemplified. However, the specific configuration of the connection detection unit 59 is not particularly limited as long as the connection detection unit 59 is configured so that detection signals used to identify the connection/non-connection of the cables are output.

The detection signals (a detection signal for the power terminal t-Vin and a detection signal for the video terminal t-Video) by the connection detection unit 59 are supplied to the control unit 51.

The pan/tilt head 10 includes pan and tilt mechanisms, as described above. As the units corresponding to the pan and tilt mechanisms, a pan mechanism unit 53, a pan motor 54, a tilt mechanism unit 56, and a tilt motor 57 are shown in FIG. 8.

The pan mechanism unit 53 includes a mechanism which allows the digital still camera 1 mounted on the pan/tilt head 10 to move in the pan (horizontal/right and left) direction shown in FIG. 4. The movement of the mechanism can be implemented by rotation of the pan motor 54 in a forward or backward direction.

Likewise, the tilt mechanism unit 56 includes a mechanism which allows the digital still camera 1 mounted on the pan/tilt head 10 to move in the tilt (vertical/upper and lower) direction shown in FIGS. 5A and 5B. The movement of the mechanism can be implemented by rotation of the tilt motor 57 in a forward or backward direction.

The control unit 51 accomplished by a microcomputer formed in combination with a CPU, a ROM, a RAM, and the like controls the movements of the pan mechanism unit 53 and the tilt mechanism unit 56.

For example, when the control unit 51 controls the movement of the pan mechanism unit 53, the control unit 51 outputs a signal for instructing a movement direction and a movement speed to the pan driving unit 55. The pan driving unit 55 generates a motor driving signal corresponding to the input signal and outputs the motor driving signal to the pan motor 54. The motor driving signal is a pulse signal corresponding to PWM control, for example, when the motor is a step motor.

The pan motor 54 rotates, for example, in a necessary rotation direction and at a necessary rotation speed in response to the motor driving signal. As a consequence, the pan mechanism unit 53 is also driven to be moved in the movement direction corresponding to the necessary rotation and at the movement speed corresponding to the necessary rotation speed.

Likewise, when the control unit 51 controls the movement of the tilt mechanism unit 56, the control unit 51 outputs a signal for instructing a movement direction and a movement speed necessary in the tilt mechanism unit 56 to the tilt driving unit 58. The tilt driving unit 58 generates a motor driving signal corresponding to the input signal and outputs the motor driving signal to the tilt motor 57. The tilt motor 57 rotates, for example, in a necessary rotation direction and at a necessary rotation speed in response to the motor driving signal. As a consequence, the tilt mechanism unit 56 is also driven to be moved in the movement direction corresponding to the necessary rotation and at the movement speed corresponding to the necessary rotation speed.

Here, the pan mechanism unit 53 includes a rotary encoder (rotation detector) 53*a*. The rotary encoder 53*a* outputs a detection signal indicating a rotation angular amount to the control unit 51 in response to the rotational movement of the pan mechanism unit 53. Likewise the tilt mechanism unit 56 includes a rotary encoder 56*a*. The rotary encoder 56*a* also outputs a signal indicating a rotation angular amount to the control unit 51 in response to the rotational movement of the tilt mechanism unit 56.

Thus, the control unit 51 can acquire (monitor) information regarding the rotational angular amounts of the pan mechanism unit 53 and the tilt mechanism unit 56 being driven in real time.

The communication unit 52 is a unit which communicates with the pan/tilt head correspondence communication unit 34 of the digital still camera 1 mounted on the pan/tilt head 10 according to a predetermined communication scheme.

Like the pan/tilt head correspondence communication unit 34, the communication unit 52 has a physical layer configuration in which wired or wireless communication signals can be transmitted to and received from the other-side communication unit of the pan/tilt head 10 and a configuration in which a communication process corresponding to a predetermined upper layer of the physical layer is implemented. In the physical layer configuration, the connector 14 of the camera pedestal unit 12 is included in correspondence to the configuration of FIG. 2.

Specifically, the operation unit 60 collectively refers to an operator as the menu button 60*a* shown in FIG. 4 or 6 and an operation information signal output unit which generates operation information signals in response to the operation executed in the operator and outputs the operation information signals to the control unit 51. The control unit 51 performs a predetermined process in response to the operation information signal input from the operation unit 60.

When a remote controller is prepared for the pan/tilt head 10, a reception unit receiving command signals from the remote controller is also an example of the operation unit 60.

2. EXEMPLARY FUNCTION CONFIGURATION

Figure 9:
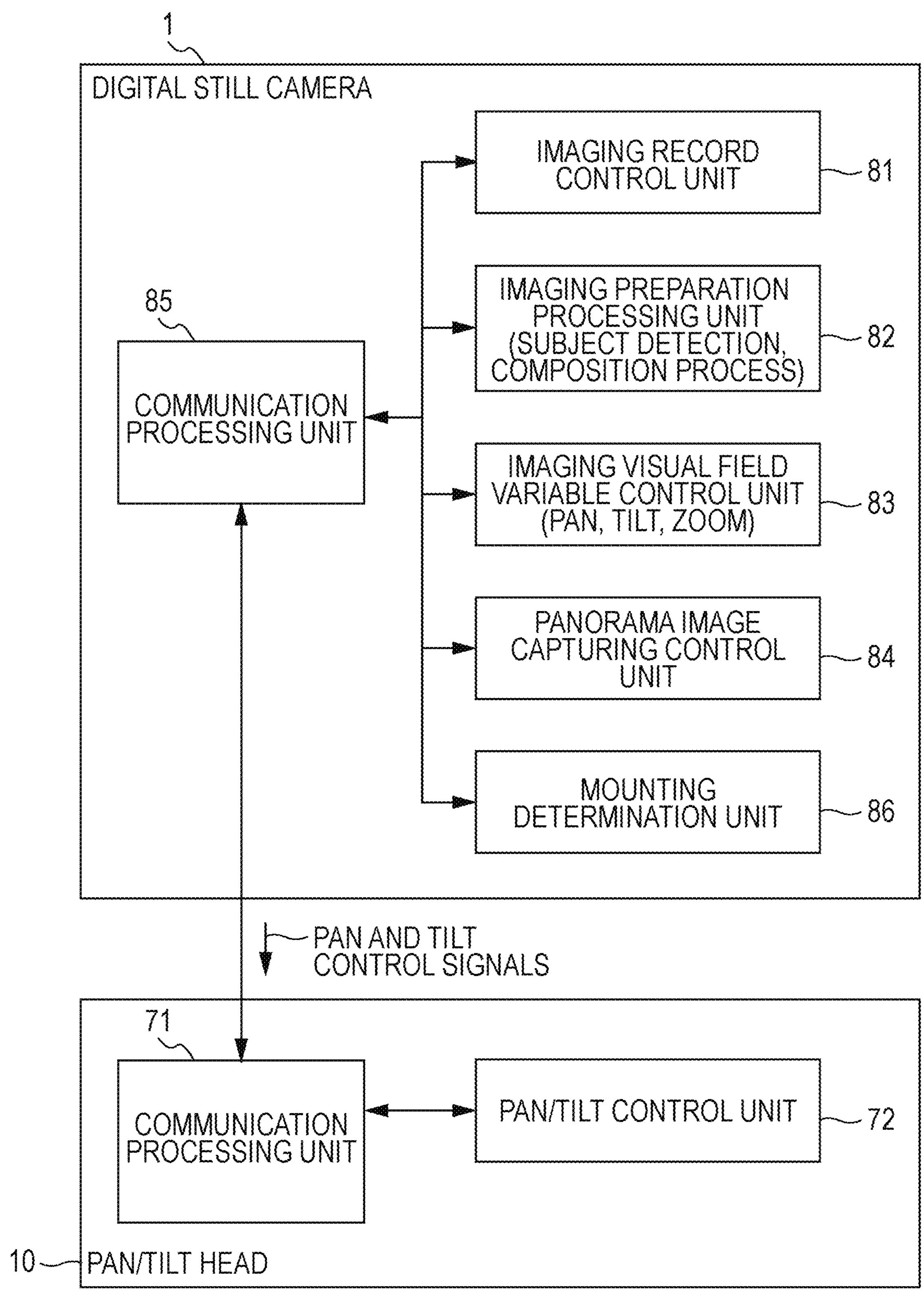
FIG. 9 is a diagram illustrating a control function configuration according to the embodiment.

FIG. 9 is a block diagram illustrating an exemplary function configuration implemented by hardware and software (program) for the digital still camera 1 and the pan/tilt head 10 according to this embodiment.

This exemplary function configuration is a configuration embodying the imaging control apparatus controlling of the imaging process of this exemplary imaging system. The function configuration mainly describes the hardware structure of the control unit 27 of the digital still camera 1, the control unit 51 of the pan/tilt head 10, and the like and control processing functions implemented in association with software modules activated by the units.

In FIG. 9, the blocks of control functions necessary for the automatic panorama image capturing and the automatic still image capturing, which will particularly be described below, are each shown.

As shown in FIG. 9, the digital still camera 1 (the control unit 27) includes an imaging record control unit 81, an imaging preparation processing unit 82, an imaging visual field variable control unit 83, a panorama image capturing control unit 84, a communication processing unit 85, and a mounting determination unit 86.

For example, the pan/tilt head 10 (the control unit 51) includes a communication processing unit 71 and a pan/tilt control unit 72.

First, the imaging record control unit 81 of the digital still camera 1 is a unit which acquires an image obtained by imaging as data (captured-image data) of an image signal and controls storage of the captured-image data in a recording medium. The imaging record control unit 81 also controls reproduction and display processes of the recorded still image data or a display process or the like of the through image at the imaging time.

That is, the imaging record control unit 81 controls the optical system unit 21, the image sensor 22, the A/D converter 23, the signal processing unit 24, the encoding/decoding unit 25, the media controller 26, the display driver 32, and the like in FIG. 7. That is, the imaging record control unit 81 is a function unit which controls the basic processes of the digital still camera 1, for example, gives an instruction for the lens driving control of the optical system unit 21 and the imaging process, the imaging signal process, a record reproduction process, and the like of the image sensor 22 and performs the still image capturing.

The imaging preparation processing unit 82 is a function unit which performs an imaging preparation process when automatic still image capturing (imaging in an automatic still image capturing mode described below) without the release operation of the user.

One example of the imaging preparation process is a subject detection process. The subject detection process is a process of confirming each frame image obtained by the signal processing unit 24 while performing the pan/tilt process of the pan/tilt head 10 and entering a subject (for example, the face of a person) within the imaging visual field. Therefore, the imaging preparation processing unit 82 performs, for example, a process of determining the necessary pan/tilt process of the pan/tilt head 10 or a process of detecting a person, a face, or the like by the image analysis of the frame image data.

One example of the imaging preparation process is a composition process. The composition process is a process of determining whether the disposition of a subject image within the imaging visual field is optimum (composition determination) and adjusting the composition (composition adjustment). To adjust the composition, the imaging preparation processing unit 82 performs, for example, a process of determining the necessary pan/tilt process of the pan/tilt head 10 or a process of determining driving the zoom lens in the optical system unit 21.

The processing function of performing the image analysis for the subject detection process or the composition process may be performed not by the control unit 27 but the DSP (Digital Signal Processor) serving as the signal processing unit 24. Therefore, a function unit serving as the imaging preparation processing unit 82 may be implemented by a program or an instruction assigned to one or both of the control unit 27 and the DSP serving as the signal processing unit 24.

The imaging visual field variable control unit 83 is a function unit which controls a process of actually varying the imaging visual field. The imaging visual field is varied by the pan/tilt of the pan/tilt head 10 or the zoom process of the optical system unit 21. Therefore, the imaging visual field variable control unit 83 is a function unit which performs the pan/tilt control and the zoom control.

When a cameraman manually takes a photograph of an image with the digital still camera 1, the imaging visual field variable control unit 83 controls the driving of the zoom lens, for example, in response to the zoom operation of the cameraman.

When the automatic still image capturing is performed or the panorama image capturing is performed in the mounted state on the pan/tilt head 10, the imaging visual field variable control unit 83 performs zoom driving control, pan driving control, and tilt driving control in response to the determination or instruction for the imaging preparation processing unit 82 or the instruction from the panorama image capturing control unit 84.

In the pan driving control and the tilt driving control, pan/tilt control signals are transmitted to the pan/tilt head 10 via the communication processing unit 85.

For example, the imaging visual field variable control unit 83 outputs the pan/tilt control signals to give an instruction for pan/tilt movement amounts determined by the imaging preparation processing unit 82 to the pan/tilt head 10 in response to the pan/tilt movement amounts, when the composition adjustment or the like is performed.

The imaging visual field variable control unit 83 also drives and controls the zoom process of the optical system unit 21 in response to a zoom magnification determined by the imaging preparation processing unit 82.

When the panorama image capturing is performed on the mounted state on the pan/tilt head 10, the rotational movement in the substantially horizontal direction in panorama image capturing is achieved. Therefore, the imaging visual field variable control unit 83 also transmits the pan/tilt control signal to mainly give an instruction for the pan process to the pan/tilt head 10 via the communication processing unit 85.

The communication processing unit 85 is a unit which communicates with the communication processing unit 71 of the pan/tilt head 10 according to a predetermined communication protocol.

The pan/tilt control signals generated by the imaging visual field variable control unit 83 are transmitted to the communication processing unit 71 of the pan/tilt head 10 by the communication of the communication processing unit 64.

The mounting determination unit 86 determines whether the digital still camera 1 is mounted on the pan/tilt head 10.

For example, the communication for recognition of a predetermined apparatus is executed with the communication processing unit 71 (the control unit 51) of the pan/tilt head 10 via the communication processing unit 85. When the pan/tilt head 10 can be recognized as the predetermined apparatus by this communication, the mounting determination unit 86 determines that the digital still camera 1 is mounted on the pan/tilt head 10.

In this example, by locating the pan/tilt head 10 as a predetermined type of rotatable stand holding the main body of the digital still camera 1 so as to be rotatable in a substantially horizontal direction, the mounted state on the pan/tilt head 10 is determined. This determination is one method of detecting whether the digital still camera 1 is in a stable rotatable state.

The relationship with the claims of the invention is as follows.

In this embodiment, the optical system unit 21, the image sensor 22, the A/D converter 23, and the signal processing unit 24 in FIG. 7 correspond to an imaging unit of the claims of the invention.

The encoding/decoding unit 25 and the media controller 26 correspond to a recording unit of the claims of the invention.

The mounting determination unit 86 (the control unit 27) in FIG. 9 corresponds to a stable rotation state detection unit of the claims of the invention.

The panorama image capturing control unit 84 (the control unit 27) in FIG. 9 corresponds to a control unit of the claims of the invention.

Next, the communication unit 71 of the pan/tilt head 10 in the function configuration of FIG. 9 is a unit which communicates with the communication processing unit 85 of the digital still camera 1.

When the pan/tilt control signals are received, the pan/tilt control signals are output to the pan/tilt control unit 72.

The pan/tilt control unit 72 executes the function of performing the process associated with the pan/tilt control in the control performed by the control unit 51 of the pan/tilt head 10 shown in FIG. 8, for example.

The pan/tilt control unit 72 controls the pan driving unit 55 and the tilt driving unit 58 shown in FIG. 8 in response to the input pan/tilt control signals. Thus, for example, panning or tilting for the panorama image capturing or a subject detection process or panning or tilting for obtaining an optimum horizontal visual angle and an optimum vertical visual angle for the composition process are used.

In FIG. 9, the blocks of the control function units are shown, but may not be implemented by each independent program module or hardware. In effect, a processing process according to an embodiment described below may be implemented as a comprehensive process of the control function units.

3. AUTOMATIC STILL IMAGE CAPTURING MODE PROCESS

Hereinafter, the automatic still image capturing mode process performed when the digital still camera 1 is mounted on the pan/tilt head 10 will be described.

Figure 10:
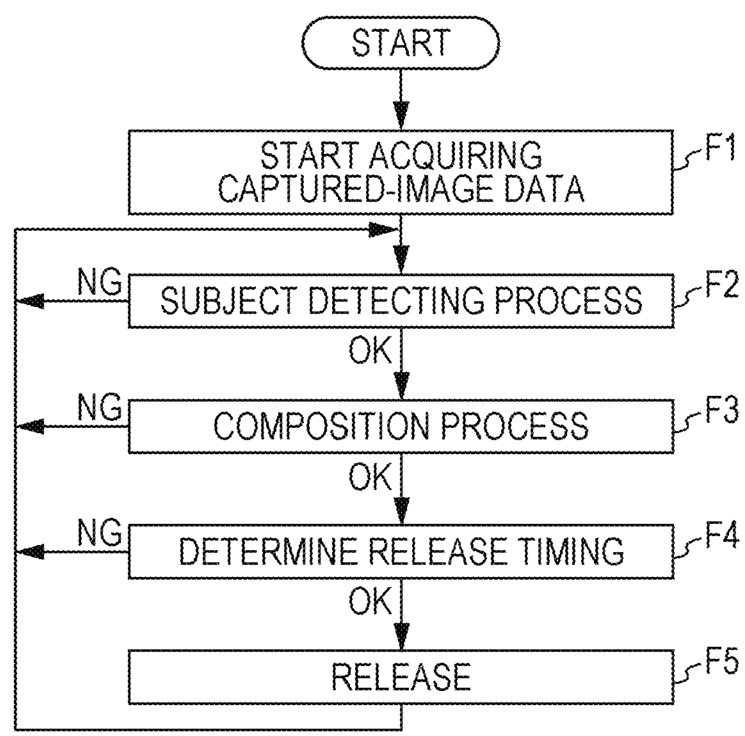
FIG. 10 is a flowchart illustrating automatic still image capturing mode process according to the embodiment.

FIG. 10 is a flowchart illustrating automatic still image capturing mode process with no release operation of a user according to the embodiment.

In the automatic still image capturing mode where the automatic still image capturing is performed, the imaging system of this example performs, as imaging preparation, automatic composition adjustment by setting the composition, which is determined to be considered to be optimum for the form of a subject detected by the subject detection process, as a target composition by each process of the subject detection (search), the optimum composition determination, and the composition adjustment. In addition, the release process is automatically performed under a predetermined condition. Thus, the appropriate still image capturing is performed without the operation of a cameraman.

When the imaging process starts in the automatic still image capturing mode, acquiring the captured-image data starts in step F1 of FIG. 10.

That is, the imaging record control unit 81 starts acquiring each frame of the captured-image data captured and processed by the image sensor 22 and the signal processing unit 24.

In step F2, the subject detection process is performed. In step F3, the composition process is performed.

The subject detection process and the composition process (the optimum composition determination and the composition adjustment) are executed by the function of the imaging preparation processing unit 82 (specifically, the process of the control unit 27 and/or the signal processing unit 24).

After the acquiring of the captured-image data starts in step F1, the signal processing unit 24 sequentially obtains the frame image data corresponding to one still image as the captured-image data captured by the image sensor 22.

As the subject detection process, the imaging preparation processing unit 82 detects an image part corresponding to the face of a person from each frame image data.

The subject detection process may be performed on each of all of the frames or may be performed at the interval of the predetermined number of frames.

In the subject detection process of this example, a face frame corresponding to the area of the face part of the image is set in each subject detected from the image using, for example, a so-called face detection technique. Moreover, information regarding the number of subjects within the image frame, the size of each subject, or the position of the subject within each image frame is obtained from the information regarding the number, size, or position of the face frames.

Many face detection techniques have been suggested. In this embodiment, the face detection technique is not particularly limited. An appropriate face detection technique may be used in consideration of detection precision, the degree of design difficulty, or the like.

In the subject detection process of step F2, subjects existing near the digital still camera 1 are searched for first.

Specifically, in the search for the subject, the subject detection process is performed by the image analysis of, for example, the signal processing unit 24 (or the control unit 27), while the control unit 27 (the imaging preparation processing unit 82 and the imaging visual field variable control unit 83) of the digital still camera 1 performs the pan/tilt control for the pan/tilt head 10 or the zoom control for the optical system unit 21 in order to vary the imaging visual field.

The search for the subject is performed until the subject is detected in the frame image as the captured-image data. Then, the search for the subject ends when the subject (the face of a person) existing in the frame image, that is, the imaging visual field at that time is detected.

After the subject detection process ends, the control unit 27 (the imaging preparation processing unit 82) performs the composition process in step F3.

In the composition process, it is first determined whether the composition at that time is optimum. In this case, an image structure is determined based on the subject detection result (in this case, the number of subjects, the size of the subject, the position of the subject, and the like in the image frame are determined), and then the composition considered to be optimum is determined according to a predetermined algorithm based on the information regarding the image structure determined in the image structure determination.

In this case, the composition can be determined depending on each imaging visual field of the pan, the tilt, and the zoom. Accordingly, in the process of determining whether the composition is optimum, information regarding the controlled variables of pan, tilt, and zoom for obtaining the optimum imaging visual field in response to the subject detection result (the form of the subject within the image frame) is obtained as the determination result.

When the composition is not optimum, the pan/tilt control and the zoom control are performed as the composition adjustment to achieve the optimum composition state.

Specifically, the control unit 27 (the imaging preparation processing unit 82 and the imaging visual field variable control unit 83) instructs the control unit 51 of the pan/tilt head 10 to obtain modification information regarding each controlled variables of the pan/tilt obtained by the optimum composition determination for the control of the composition adjustment.

Then, the control unit 51 of the pan/tilt head 10 obtains the movement amounts of the pan mechanism unit 53 and the tilt mechanism unit 56 in response to the instruction for the controlled variables and supplies the control signals to the pan driving unit 55 and the tilt driving unit 58 to implement the pan driving and the tilt driving of the obtained movement amounts.

In addition, the control unit 27 (the imaging preparation processing unit 82 and the imaging visual field variable control unit 83) instructs the optical system unit 21 to obtain information regarding the image angle for the zoom obtained by the optimum composition determination and allows the optical system unit 21 to perform the zoom process so as to obtain the instructed image angle.

When it is determined that the composition is not optimum by the composition process and the pan/tilt control and the zoom control are performed as the composition adjustment, the process resumes from the subject detection process of step F2. This is because the subject may deviate from the imaging visual field due to the pan, tilt, zoom processes or the movement of the person.

When obtaining the optimum composition, the control unit 27 (the imaging record control unit 81) determines the release timing in step F4.

The release timing may not be OK in the release timing determination process of step F4 in some cases. In this case, however, the process resumes from the subject detection process of step F1. This is because the subject may deviate from the imaging visual field due to the movement of the person or the like or the composition may be collapsed.

When it is considered that the release condition is satisfied in the release timing determination process, the captured-image data is automatically recorded as the release process of step F5. Specifically, the control unit (the imaging record control unit 81) controls the encoding/decoding unit 25 and the media controller 26 in order to record the captured-image data (frame image) obtained at that time in the memory card 40.

Here, the release timing determination process of step F4 is a process of determining whether the conditions for predetermined still image capturing are satisfied in order to obtain an appropriate still image. Various examples thereof may be considered.

For example, the release timing determination for time is considered. For example, a predetermined time (for example, 2 or 3 seconds) which has elapsed from the time at which the composition process is OK may be set as the condition of the still image capturing. In this case, the control unit 27 (the imaging record control unit 81) measures a predetermined time in step F4. After the predetermined time, the control unit 27 performs the release process in step F5.

When a specific subject state is determined from the captured image, it may be determined that the condition of the still image capturing is satisfied.

The control unit 27 (the imaging record control unit 81) monitors existence or non-existence of the specific subject state detected by the analysis of the captured image in step F4.

As the specific subject state, a specific expression such as a smiling face of the subject determined in the composition process or a specific gesture of a behavior such as waving a hand toward the imaging system, raising a hand, clapping hands, making a peace sign, or winking toward the imaging system may be considered. Alternatively, behavior or the like of the user as a subject gazing at the imaging system may be considered.

In step F4, the control unit 27 determines the specific state of the user by the image analysis process on the captured-image. When the specific subject state is detected, it is assumed that the release timing has been reached and thus the release process is performed in step F5.

In a case where the digital still camera 1 includes a voice input unit, it may be determined that the condition of the still image capturing is satisfied when a specific sound is input.

For example, a specific word uttered by the user, a clapping sound, a whistling sound, or the like may be regarded as the specific sound which is the condition of the still image capturing. In step F4, the control unit 27 (the imaging record control unit 81) detects the input of the specific sound.

When the specific sound is confirmed as the analysis result of the input voice signal from the voice input unit, it is assumed that it is the release timing and thus the release process is performed in step F5.

As in FIG. 10, the image still capturing in the automatic still image capturing mode is implemented based on the control process of the control unit 27.

4. PANORAMA IMAGE CAPTURING MODE PROCESS

Next, the panorama image capturing mode process will be described.

The digital still camera 1 according to this embodiment can capture an image in the automatic still image capturing mode when the digital still camera 1 is mounted on the pan/tilt head 10. However, an image can be captured in the panorama image capturing mode, both when the single digital still camera 1 is not mounted on the pan/tilt head 10 and when the digital still camera 1 is mounted on the pan/tilt head 10.

Figure 11:
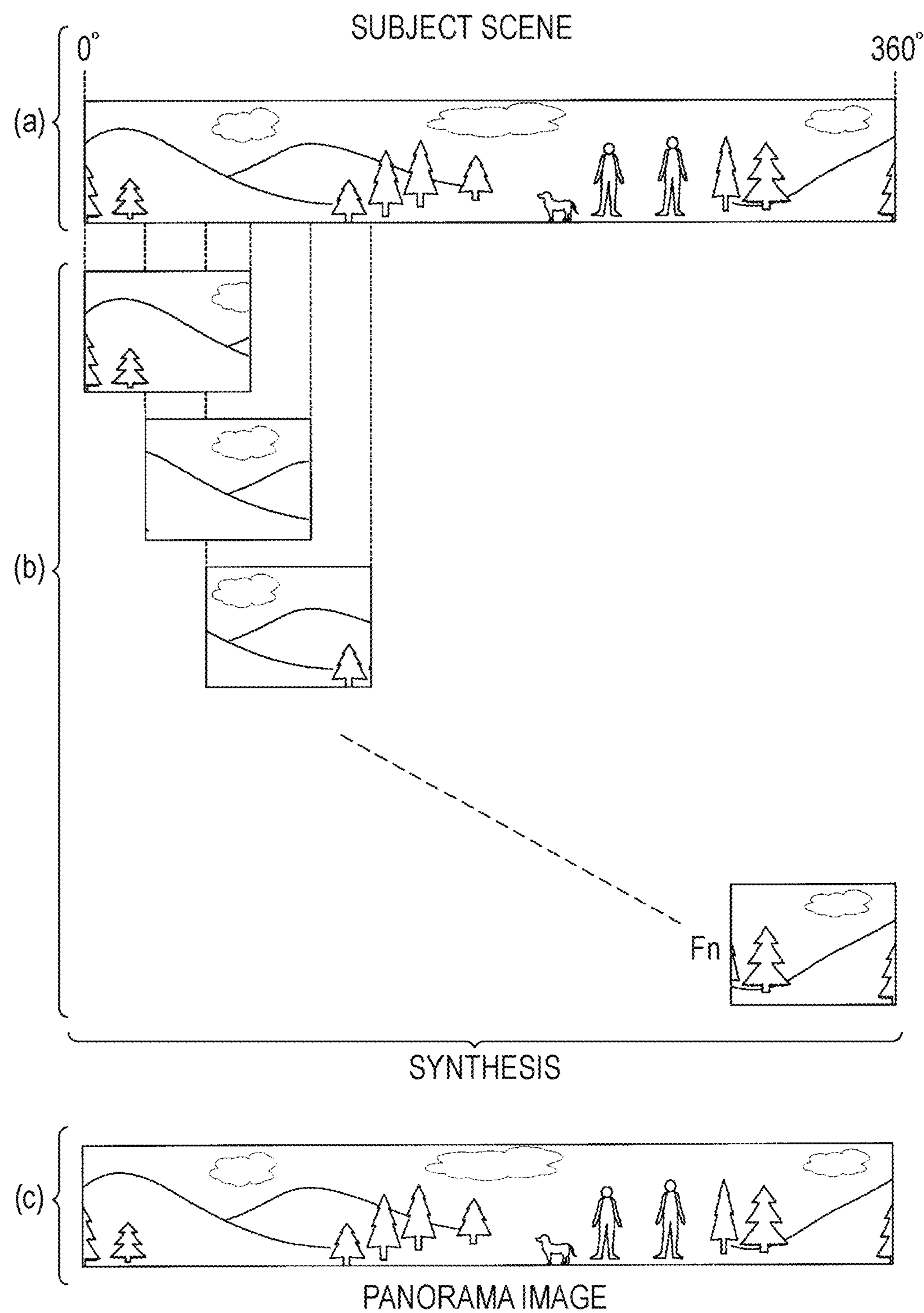
FIG. 11 is a diagram illustrating panorama image capturing according to the embodiment.

First, the overview of the panorama image capturing is shown in FIG. 11.

For example, a 360-degree surrounding scene captured at the position of the digital still camera 1 as the center position is shown in Part (a) of FIG. 11. The panorama image capturing is a process of obtaining the surrounding scene as one image within a wide range.

The processes of the digital still camera 1 are as follows.

For example, when the user holds the digital still camera 1 with his hands to perform the panorama image capturing, the user moves the digital still camera 1 horizontally in the subject direction (imaging visual field) of the digital still camera 1 in an operation state (for example, pressing the release button 31*a*) of a predetermined imaging process. For example, the digital still camera 1 is rotatably moved around the user, for example, from the left to the right to capture a scene entering the image frame of the digital still camera 1.

During the horizontal movement, the digital still camera 1 acquires frame image data captured at each predetermined frame interval, as frames F1, F2, F3, . . . , and Fn shown in Part (b) of FIG. 11.

The synthesis process is performed using necessary areas of the frame image data F1 to Fn. Here, the detailed description of the synthesis process is omitted, but the images captured as the plurality of frame image data are linked to each other consequently. Then, the panorama image data as shown in Part (C) of FIG. 11 is generated and recorded as one piece of panorama image data in the memory card 40.

Figure 12:
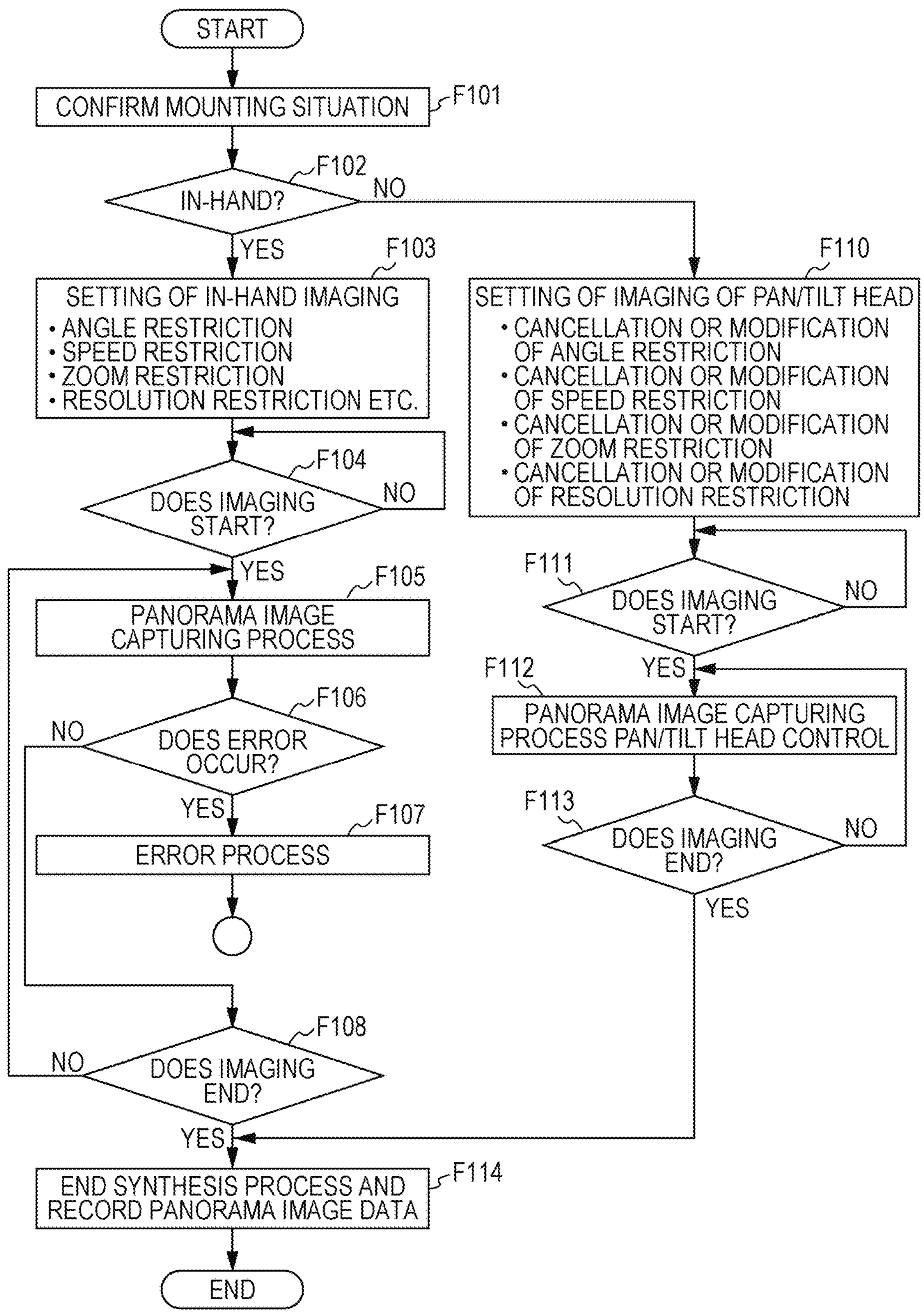
FIG. 12 is a flowchart illustrating panorama image capturing mode process according to the embodiment.

The process of performing the imaging process in the panorama image capturing mode by the control unit 27 is shown in FIG. 12.

When the panorama image capturing mode is set by a predetermined operation of the user, the control unit 27 starts the process of FIG. 12.

In step F101, the control unit 27 (the mounting determination unit 86) determines whether the digital still camera 1 is mounted on the pan/tilt head 10. For example, as described above, the mounting determination unit 86 attempts communication from the communication processing unit 85 to the pan/tilt head 10 for apparatus recognition. When the communication with the pan/tilt head 10 can be established and it is confirmed that a communication destination is the pan/tilt head 10 of this example, the mounting determination unit 86 determines that the digital still camera 1 is currently in the stable rotation state.

On the other hand, when the communication with the pan/tilt head 10 is not possible, the mounting determination unit 86 determines that the user holds the digital still camera 1 to try the panorama image capturing.

When the mounting determination unit 86 determines that the digital still camera 1 is in the stable rotation state, the control unit 27 allows the process to proceed to step F110. On the other hand, when it is determined that the user holds the digital still camera 1 with his hands to perform the panorama image capturing, the process proceeds to step F103.

First, the case where it is determined that the digital still camera is held by the hands will be described.

In this case, the control unit 27 (the panorama image capturing control unit 84) sets an in-hand imaging parameter in step F103.

An example is given.

For example, setting of angle restriction is performed such that an angle range in which the panorama image capturing is performed is restricted within a predetermined angle range. For example, the parameter is set such that an angle range from 0° to 270° is set as an imaging angle range.

The reason for setting this parameter is that since a vertical gap mostly occurs in the joins of 0-degree frame image data and 360-degree frame image data when the digital still camera is held by the hands and thus causing difficulty in generating high-quality panorama image data, the imaging of a range of 360° is not performed. Moreover, an angle may become too wide and a vertical gap may be increased during the horizontal movement by the user.

Setting of speed restriction is performed such that an allowable speed range in the panorama image capturing is restricted within a predetermined speed range. For example, the parameter is set such that a range from 20°/sec to 100°/sec is set as the allowable speed range.

The reason for setting this parameter is that when the user rotatably moves the digital still camera 1 horizontally, a gap is increased when the movement speed is too fast or too slow, and thus it is difficult to perform the synthesis process and high-quality panorama image data may not be generated.

Setting of zoom restriction is performed such that a zoom process is restricted in the panorama image capturing. For example, the setting is performed such that zooming is prohibited and is fixed to a predetermined zoom angle. Alternatively, the setting is performed such that zooming is restricted to be increased up to double.

When the zoom magnification is increased, the imaging visual field is narrowed to that extent. Therefore, blurring in the vertical direction or a gap occurs markedly on an image when the user moves the digital still camera. Therefore, when the panorama image capturing is performed at a high zoom magnification, it is difficult to perform the synthesis process and high-quality panorama image data may not be generated.

Setting of resolution restriction is performed such that a resolution is restricted within a predetermined value. For example, the number of pixels may be restricted. For instance, the setting is performed such that the resolution is restricted to 5000×1000 pixels.

This setting is also performed in consideration of the instability such as blur when the user moves the digital still camera 1 with his hands.

The control unit 27 (the panorama image capturing control unit 84) performs, for example, some or all of these settings in step F103. Of course, other settings may be considered.

Then, waiting for the start of the imaging occurs in step F104. For example, the start is delayed until the user presses down the release button 31*a*.

When the user presses down the release button 31*a*, the process proceeds to step F105 and the control unit 27 (the panorama image capturing control unit 84) performs the panorama image capturing.

That is, the panorama image capturing control unit 84 allows the signal processing unit 24 to read the frame image data F1, F2, and so on at a predetermined frame interval, for example, as shown in FIG. 11 and simultaneously to perform the synthesis process using the frame image data F1, F2, and so on.

The control unit 27 (the panorama image capturing control unit 84) monitors an error occurrence situation or the end of the imaging depending on the above-described parameters.

When the zoom restriction is set, the control unit 27 (the panorama image capturing control unit 84 and the imaging visual field variable control unit 83) controls a process of cancellation of the zoom operation and a predetermined fixed zoom magnification.

The control unit 27 (the panorama image capturing control unit 84) gives an instruction for the set resolution to the signal processing unit 24.

The panorama image capturing of step F105 is performed until it is determined that an error occurs in step F106 or it is determined that the imaging has ended in step F108.

The case where the imaging ends in step F108 is as follows.

For example, when the user presses down the release button 31*a* during the panorama image capturing as an operation method, the panorama image capturing ends at the time at which the user releases the release button 31*a*. That is, the control unit 27 (the panorama image capturing control unit 84) monitors the operation from the operation unit 31 during the panorama image capturing of step F105. Therefore, when the user releases the release button 31*a*, it is determined that the imaging has ended.

For example, as an operation of the panorama image capturing, the imaging starts when the user initially presses down the release button 31*a*, and then the imaging has ended when the user presses down the release button 31*a* once again. In this case, it is determined that the imaging has ended when the release button 31*a* is pressed down at twice.

When the above-described angle restriction is set, the control unit 27 (the panorama image capturing control unit 84) calculates the present angle position of the panorama image capturing from information regarding the movement speed from the movement detection unit 35 and a time taken from the start of the imaging during the processing of step F105. For example, the present angle position is determined by setting the position of the start point of the panorama image capturing as 0°. When the angle is set to be restricted to 270°, as described above, the end of the imaging is controlled at the time at which the angle position exceeds 270°. That is, in this case, the panorama image capturing forcibly ends, even when the user keeps pressing down the release button 31*a*.

The control unit 27 (the panorama image capturing control unit 84) determines the end of the imaging, for example, in the above-described manner. When the imaging ends, the process proceeds from step F108 to step F114. In step F114, the control unit 27 (the panorama image capturing control unit 84) controls the signal processing unit 24 so that the synthesis process is completed. The control unit 27 controls the encoding/decoding unit 25 and the media controller 26 to record the panorama image data formed by the synthesis process in the memory card 40. The panorama image capturing mode process when the user moves the digital still camera with his hands ends.

An error may occur during the panorama image capturing of step F105. For example, the movement speed by the user may not fall within the set speed range. The control unit (the panorama image capturing control unit 84) monitors the speed information from the movement detection unit 35 in step F105 and determines whether the detected movement speed falls within the set speed range. When the movement speed does not fall within the speed range, an error occurs at that time. In this case, the process proceeds from step F106 to step F107 in order to perform an error process. For example, the control is performed such that an error message is displayed on the display screen unit 33*a* or an error warning sound occurs. The synthesis process of the captured-image data in the signal processing unit 24 is interrupted.

When such an error occurs, for example, the process may subsequently return to step F104 or the panorama image capturing mode may end.

On the other hand, when the digital still camera 1 is mounted on the pan/tilt head 10 and it is determined that the digital still camera 1 is in the stable rotation state in step F102, the control unit 27 allows the process to proceed to step F110.

In this case, the control unit 27 (the panorama image capturing control unit 84) sets the parameters for imaging of the pan/tilt head in step F110. An example is given.

For example, setting is performed such that the restriction on the angle range in which the panorama image capturing is performed is cancelled. That is, the parameter is set such that the range from 0° to 360° is set as the imaging angle range.

The reason for setting the parameter is that when the digital still camera 1 is mounted on the pan/tilt head 10, the digital still camera 1 can be rotated accurately by 360° horizontally without the blurring in the vertical direction during the rotation time, unlike the case where the user holds the digital still camera with his hands. That is, there is no negative influence due to the blurring when the images are synthesized, and high-quality panorama image data can be generated even when the angle range is not restricted.

Depending on an apparatus, the restriction on the angle range may not be cancelled and an angle range (for example, a range from 0° to 300°) may be set to be larger than the angle range of the case the user holds the digital still camera with his hands.

Setting is performed such that a predetermined speed range within the allowable speed range in the panorama image capturing is wider than that of the case the user holds the digital still camera with his hands. For example, the parameter is set such that a range from 1°/sec to 150°/sec is set as the allowable speed range.

The reason for setting this parameter is that when the digital still camera 1 is mounted on the pan/tilt head 10, the blurring occurring when the digital still camera 1 is rotated horizontally may be not taken into consideration.

In the setting of the parameter, the upper limit of the speed may be determined. However, since the upper limit of the speed is determined by the rotational speed of the pan/tilt head 10, the restriction on the speed may be set to be cancelled.

Setting is performed such that the restriction on the zoom process in the panorama image capturing is cancelled. Alternatively, the setting is performed such that the upper limit, such as 5 times, of the zoom is larger than that of the case in which the user holds the digital still camera with his hands.

This is because the blurring during the rotation time mostly disappears even when the zoom magnification is increased, and thus there is no negative influence on the generation of high-quality panorama image data.

In the parameter setting, the upper limit of the zoom magnification may be determined. However, since the upper limit of the zoom magnification is determined by the performance of the digital still camera 1, the restriction on the zoom may be set to be cancelled.

Setting of resolution is performed such that a resolution is high. For example, the number of pixels may be set to be high. For instance, the setting is performed such that the resolution is as high as up to 15000×3000 pixels.

Unlike the case where the user holds the digital still camera with his hands, there is almost no blurring when the digital still camera 1 is rotated.

In the parameter setting, the upper limit of the resolution may be determined. However, since the upper limit of the resolution is determined by the performance of the image sensor 22 of the digital still camera 1, the restriction on the resolution may be set to be cancelled.

The control unit 27 (the panorama image capturing control unit 84) performs, for example, some or all of these settings in step F110. Of course, other settings may be considered.

Then, waiting for the start of the imaging occurs in step F111. For example, the start is delayed until the user presses down the release button 31*a*. Alternatively, the start of the imaging may be determined automatically without waiting for the operation of the user as the start of the imaging after performing the settings.

When the start of the imaging is determined, the process proceeds to step F112 and the control unit 27 (the panorama image capturing control unit 84) performs the panorama image capturing.

That is, the panorama image capturing control unit 84 allows the signal processing unit 24 to read the frame image data F1, F2, and so on at a predetermined frame interval, for example, as shown in FIG. 11 and simultaneously to perform the synthesis process using the frame image data F1, F2, and so on.

The control unit 27 (the panorama image capturing control unit 84 and the imaging visual field variable control unit 83) controls the pan/tilt head 10 in order to perform the horizontal rotation movement. That is, for example, the panning of 360° is performed.

The control unit 27 (the panorama image capturing control unit 84 and the imaging visual field variable control unit 83) performs control depending on the set movement speed. For example, when the user gives an instruction for 10°/sec as the panning speed in the panorama image capturing mode, the instructed panning speed falls within the parameter setting range and thus an instruction for the panning at the corresponding speed as the valid speed is given to the pan/tilt head 10.

The control unit 27 (the panorama image capturing control unit 84 and the imaging visual field variable control unit 83) gives an instruction for the zoom magnification or the resolution in response to the setting to the signal processing unit 24. For example, when the user selects the resolution of 15000×3000 pixels or the zoom magnification of 5 times is set, the panorama image capturing is performed in a valid state.

The panorama image capturing of step F112 is performed until it is determined that the imaging has ended in step F113. For example, the imaging ends at the time at which the panning of 360° is completed.

Alternatively, for example, when the user gives an instruction for 330° as the panning angle range in the panorama image capturing mode, the instruction is valid due to the fact that the panning angle range falls within the parameter setting range. In addition, the imaging ends at the time at which the panning of 330° is completed.

When the imaging ends, the process proceeds from step F113 to step F114. In step F114, the control unit 27 (the panorama image capturing control unit 84) controls the signal processing unit 24 to complete the synthesis process. The control unit 27 controls the encoding/decoding unit 25 and the media controller 26 to record the panorama image data formed by the synthesis process in the memory card 40. The panorama image capturing mode process when the digital still camera 1 is mounted on the pan/tilt head 10 ends.

In this embodiment, the control setting are different when the user moves the digital still camera with his hands or the digital still camera is mounted on the pan/tilt head 10 in the panorama image capturing mode.

Accordingly, various kinds of panorama image capturing are possible, while a high-quality panorama image is acquired.

That is, when the digital still camera 1 is mounted on the pan/tilt head 10, there is no blurring in the vertical direction occurring when the user moves the digital still camera with his hands. Therefore, high-quality imaging can be performed even when the restriction on the imaging angle range, the restriction on the speed, the restriction on the zoom, the restriction on the resolution, and the like are not imposed. When the digital still camera 1 is mounted on the pan/tilt head 10, these restrictions may be cancelled or expanded to perform various kinds of panorama image capturing.

For example, by enabling the panorama image capturing of 360°, the entire surrounding scene can be obtained as an impressive high-quality still image.

For example, when a night scene is captured, slow rotation is suitable due to the exposure time. However, by cancelling the restriction on the speed, a panorama image with a higher quality can be captured.

5. VARIOUS MODIFIED EXAMPLES

In the above-described embodiment, the settings of the angle range, the movement speed, the zoom magnification, and the resolution are exemplified as the modification examples of the control setting in the panorama image capturing mode when the digital still camera is held by the hands or is mounted on the pan/tilt head 10. However, other various examples of the control settings may be considered. The control settings will be exemplified.

Setting of Enabling Multiple Panoramas Only when Mounted on Pan/Tilt Head 10

When the digital still camera 1 is mounted on the pan/tilt head 10, it is not necessary to take the blurring into consideration, as described above. Accordingly, the quality of the panorama image is maintained and more various kinds of panorama image capturing can be implemented.

As one thereof, a method of capturing the multiple-panorama image to obtain a bigger image may be considered.

The multiple-panorama image refers to an image which is wide in both the horizontal and vertical directions and is acquired by performing the imaging, for example, by twice-panning twice with a change in the tilt direction.

Figure 13A:
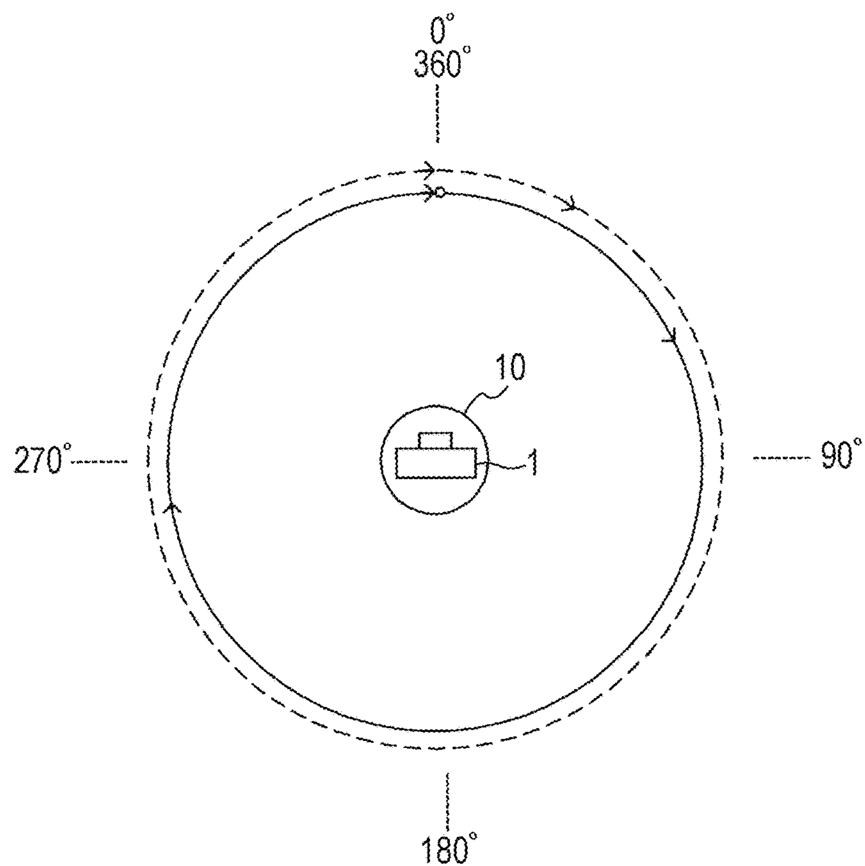
FIGS. 13A to 13C are diagrams illustrating multiple-panorama image capturing according to the embodiment.

The digital still camera 1 mounted on the pan/tilt head 10 is shown in FIG. 13A. First, the digital still camera 1 acquires the captured-image data of many frames, while the pan/tilt head 10 pans the digital still camera 1 during a first panning as indicated by a solid arrow.

Then, the digital still camera 1 acquires the captured-image data of many frames, while the pan/tilt head 10 pans the digital still camera 1 during a second panning as indicated by a dot arrow.

Figure 13B:
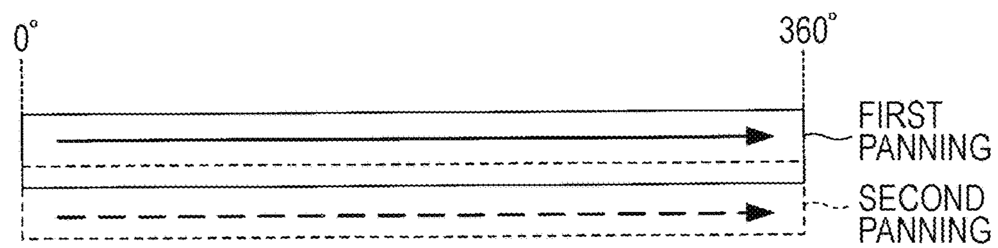

In this case, the tilt position of the imaging visual field is changed during the first panning and the second panning. For example, as shown in FIG. 13B, the tilt direction is shifted to the degree that the tilt direction partially overlaps at the time of the first panning and the time of the second panning.

The digital still camera 1 synthesizes the captured images from the first panning and the second panning in order to generate the panorama image data.

Figure 14A:
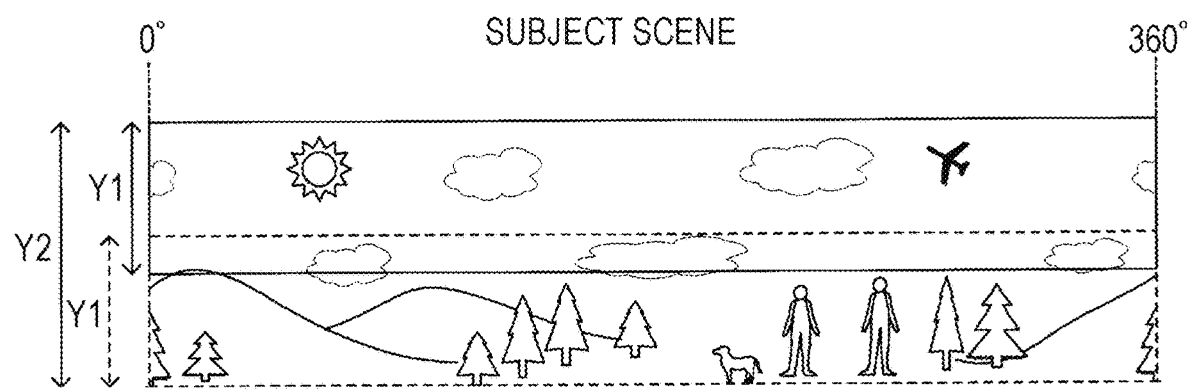
FIGS. 14A and 14B are diagrams illustrating an example of a photographed multiple-panorama image according to the embodiment.
Figure 14B:
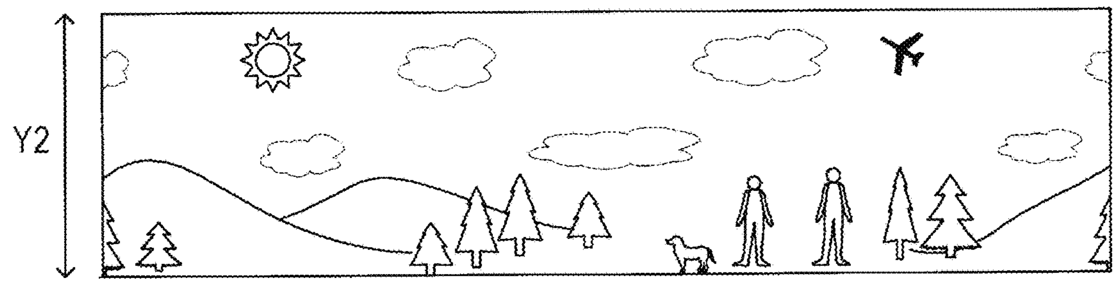

By performing the multiple-panorama image capturing, for example, a panorama image shown in FIGS. 14A and 14B can be obtained.

For example, a range falling in a size in the vertical direction of the imaging visual field is assumed to be Y1 at the zoom magnification of the digital still camera 1 in the 360-degree surrounding subject scene as shown in FIG. 14A.

In this case, by capturing the scene falling within the range indicated by the solid-line in the first panning and the scene falling within the range indicated by a dashed-line at the second panning and performing the synthesis process, the panorama image data including a scene within a range Y2 in the vertical direction as shown in FIG. 14B can be generated.

Here, the panorama image is captured by performing the panning twice, but may be captured by performing the panning three or more times, of course. Thus, panorama image data including a subject scene wider in the extended vertical direction can be obtained.

As well as the horizontal panning at each panning time, spiral rotation may be performed using the tilt process.

Figure 13C:
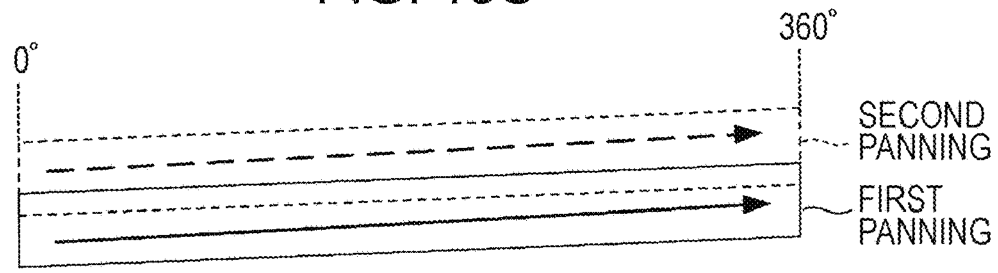

For example, the panning is performed, for example, twice while continuously performing upward tilting by a predetermined amount. As shown in FIG. 13C, a spiral surrounding scene can be captured so that a wider scene is included in the vertical direction. Of course, the panning may be performed three or more times.

As for the multiple-panorama image capturing described above, high-quality panorama image data may not be generated unless completely stable panning and tilting are performed. In effect, when the user holds the digital still camera in order to perform the panorama image capturing by panning a plurality of times, a gap may occur in the scene or the sizes in the vertical direction at the respective angle positions may not match with each other. Therefore, it is difficult to obtain a satisfactory synthesized image.

Accordingly, the control unit 27 (the panorama image capturing control unit 84) may change the control setting by permitting the multiple-panorama image capturing when the digital still camera 1 is mounted on the pan/tilt head 10. On the other hand, when the digital still camera is held by the hands, the control unit 27 may change the control setting by prohibiting the multiple-panorama image capturing.

Setting of Controlling Panning Speed Depending on Situation Only when Mounted on Pan/Tilt Head 10

When the digital still camera 1 is mounted on the pan/tilt head 10, for example, the digital still camera is rotated at a predetermined panning speed by the pan/tilt head 10. The most appropriate panning speed is different depending on a situation.

For example, slow panning is preferable when the surroundings are dark. Fast panning is preferable to some extent when the surroundings are light.

Here, the digital still camera 1 includes a sensor detecting the amount of surrounding light so that the panning speed is controlled in response to the amount of surrounding light. That is, the control unit 27 instructs the pan/tilt head 10 both of the panning and the panning speed.

In the control setting, the control of the panning speed is valid only when the digital still camera 1 is mounted on the pan/tilt head 10.

When the digital still camera is held by the hands, the control of the panning speed is difficult due to the movement of the user. However, in this case, control may be performed so that the user is guided.

For example, when the surroundings are considered to be dark by the detection of the amount of outside light, a message "Please move more slowly than usual" may be displayed on the display screen unit 33*a*.

The control of the panning speed in the pan/tilt head 10 may be performed depending on both the surrounding amount of light and the zoom magnification or the resolution at that time. For example, when the zoom magnification is high or the set resolution is high, the panning speed is controlled so as to appear visually slow.

For example, as described above, when the digital still camera 1 is mounted on the pan/tilt head 10 to be in the stable rotation state and when the digital still camera 1 is held by the hands and is in the non-stable rotation state, various different control settings are considered.

As a modified setting example, the panorama image capturing is prohibited when the digital still camera is held by the hands, whereas the panorama image capturing is permitted when the digital still camera 1 is mounted on the pan/tilt head 10.

In this embodiment, the digital still camera 1 controls the process of the pan/tilt head 10. However, the pan/tilt head 10 may control the panning process in the panorama image capturing. That is, the control unit of the digital still camera 1 only instructs the control unit 51 of the pan/tilt head 10 to start the panning, when starting the imaging in step F112. Accordingly, the control unit 51 controls the panning and tilting of a single rotation or several rotations as appropriate in the panorama image capturing.

In this embodiment, as described above, the digital still camera is in the stable rotation state when mounted on the pan/tilt head 10. However, other states may be considered as the stable rotation state.

For example, a state where the digital still camera is mounted on a tripod so as to rotate horizontally on the tripod or a state where the digital still camera is placed on a stable rotatable table such as a rotatable stand so that there is almost no blurring in the vertical direction may be considered as the stable rotation state.

Even in this case, the process from step F110 to step F113 of FIG. 12 may be performed in the stable rotation state.

That is, the stable rotation state is not limited to the state where a specific apparatus is mounted on the pan/tilt head 10.

However, the mounting of the digital still camera on the pan/tilt head 10 can be confirmed. However, the confirmation process of step F101 by the communication, that is, the stable rotation state or the non-stable rotation state may not be confirmed, unless the specific apparatus can execute the communication.

Accordingly, the following determination method is considered.

For example, there may be provided a mechanical switch or an optical sensor detecting whether the digital still camera 1 is in a mounted state on a rotatable stand, such as a tripod, which rotatably holds the digital still camera 1 in a substantially horizontal direction. The control unit 27 performs the determination of steps F101 and F102 depending on the detection result.

Moreover, when a gyro sensor is provided as the movement detection unit 35, the control unit 27 can perform the determination of the steps F101 and F102 due to the fact that it may be detected whether there is almost no movement in the vertical direction. For example, when the digital still camera 1 is mounted on a rotatable table, the movement detected by the gyro sensor is mainly movement in the horizontal direction. That is, the movement in the substantially vertical direction is rarely detected.

In this situation, in the panorama image capturing mode, it may be determined that the digital still camera is in the stable rotation state.

In this embodiment, the control unit 27 (the mounting determination unit 86) determines whether the digital still camera is in the stable rotation state. However, the control unit 27 may not perform this determination. That is, the control unit 27 may receive information indicating whether the digital still camera is in the stable rotation state from the outside.

For example, when the mounted state on the pan/tilt head 10 is detected as the stable rotation state, the control unit 51 of the pan/tilt head 10 notifies the control unit 27 of the digital still camera 1 that the digital still camera is in the stable rotation state. Thus, the control unit 27 recognizes the stable rotation state. In the point of view, the digital still camera 1 may not include the mounting determination unit 86 in the function configuration shown in FIG. 9.

The imaging apparatus (the digital still camera 1) may not include the recording function of the recording medium such as the memory card 40. For example, imaging data may not be recorded in the internal recording medium, but may be output to an external device to be displayed and recorded.

In this case, a transmission unit transmitting the imaging data to the external device may be provided instead of the media controller 26. That is, the imaging apparatus is an apparatus which outputs panorama image data when capturing a panorama image.

6. PROGRAM

A program according to this embodiment is a program causing an arithmetic processing unit (the control unit 27 or the like) such as a CPU to execute the panorama image capturing mode process of FIG. 12 according to the above-described embodiments.

That is, the program causes the arithmetic processing unit to execute a step of detecting whether the main body of the digital still camera 1 is in the stable rotation state where the digital still camera 1 is stably rotatable in the substantially horizontal direction.

The program also causes the arithmetic processing unit to execute a step of changing the control settings of the panorama image capturing between when it is detected that the digital still camera 1 is in the stable rotation state and when it is detected that the digital still camera 1 is not in the stable rotation state.

The program also causes the arithmetic processing unit to execute a step of acquiring the plurality of image data by the imaging as the control of the panorama image capturing based on the control settings and generating the panorama image data using the plurality of image data.

The program according to this embodiment may be recorded in advance in an HDD as a recording medium built in a personal computer or an apparatus such as the digital still camera 1 or the pan/tilt head 10 or in a ROM or the like of a microcomputer including a CPU.

Alternatively, the program may be permanently or temporarily stored (recorded) in a removable recording medium such as a flexible disk, a CD-ROM (Compact Disc Read Only Memory), an MO (Magnet optical) disk, a DVD (Digital Versatile Disc), a Blu-ray disk, a magnetic disk, a semiconductor memory, or a memory card. The removable recording medium can be provided as so-called package software.

The program according to the embodiment of the invention may be installed from the removable recording medium to a personal computer or the like and may also be downloaded from a download site via a network such as a LAN (Local Area Network) or the Internet.

By the program according to the embodiment of the invention, the imaging apparatus or the imaging system realizing the above-described embodiments is embodied and may be widely provided in an appropriate manner.

The present application contains subject matter related to that disclosed in Japanese Priority Patent Application JP 2010-014227 filed in the Japan Patent Office on Jan. 26, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging control apparatus, comprising:
at least one processor configured to:
detect whether a camera is attached to a device;
set a control setting of a panorama image capturing operation to a first control setting when it is detected that the camera is not attached to the device, wherein
the panorama image capturing operation is operated with holding and panning the camera according to a user operation in case the camera is not attached to the device,
the control setting of the panorama image capturing operation affects a quality of a panorama image generated by combination of a plurality of images, and
the plurality of images captured during the panorama image capturing operation;
set the control setting of the panorama image capturing operation to a second control setting when it is detected that the camera is attached to the device such that the panorama image capturing operation is operated by automatically panning the camera by the device,
wherein the first control setting is restricted compared to the second control setting,
set, in a non-stable motion state, a first speed range and a first zoom magnification range as the first control setting for the panorama image capturing operation, wherein
the camera is non-stably movable in the non-stable motion state, and
the camera is not attached to the device in the non-stable motion state; and
set, in a stable motion state, a second speed range and a second zoom magnification range as the second control setting for the panorama image capturing operation, wherein
the camera is stably movable in the stable motion state,
the camera is attached to the device in the stable motion state,
the second speed range is wider than the first speed range of the non-stable motion state, and
the second zoom magnification range is wider than the first zoom magnification range.

2. The imaging control apparatus according to claim 1, wherein the at least one processor is further configured to:
set, in the non-stable motion state, a first angle range for the panorama image capturing operation; and
set, in the stable motion state, a second angle range for the panorama image capturing operation, wherein
the second angle range is wider than the first angle range.

3. The imaging control apparatus according to claim 1, wherein
the at least one processor is further configured to detect, by a sensor, whether the camera is in the stable motion state in which the camera is stably movable in a first direction.

4. The imaging control apparatus according to claim 1, wherein the at least one processor is further configured to:
detect, by a sensor, whether the camera is mounted on the device and movable in a first direction; and
detect, by the sensor, the stable motion state based on the camera that is mounted on the device.

5. The imaging control apparatus according to claim 1, wherein
the at least one processor is further configured to detect the stable motion state based on a type of the device attached to the camera.

6. The imaging control apparatus according to claim 1, further comprising a main body, wherein
the at least one processor is further configured to detect, by a sensor, that the main body of the imaging control apparatus is in the stable motion state based on one of a first movement amount of the main body of the imaging control apparatus in a first direction or a second movement amount of the main body of the imaging control apparatus in a second direction.

7. The imaging control apparatus according to claim 1, wherein the at least one processor is further configured to record, in a recording medium, image data of the plurality of images.

8. The imaging control apparatus according to claim 1, wherein the at least one processor is further configured to generate panorama image data based on the plurality of images.

9. An imaging apparatus, comprising:
a camera; and
at least one processor configured to:
detect whether the camera is attached to a device;
set a control setting of a panorama image capturing operation to a first control setting when it is detected that the camera is not attached to the device, wherein
the panorama image capturing operation is operated with holding and panning the camera according to a user operation in case the camera is not attached to the device,
the control setting of the panorama image capturing operation affects a quality of a panorama image generated by combination of a plurality of images, and
the plurality of images is captured during the panorama image capturing operation;
set the control setting of the panorama image capturing operation to a second control setting when it is detected that the camera is attached to the device such that the panorama image capturing operation is operated by automatically panning the camera by the device,
wherein the first control setting is restricted compared to the second control setting;
set, in a non-stable motion state, a first speed range and a first zoom magnification range as the first control setting for the panorama image capturing operation, wherein
the camera is non-stably movable in the non-stable motion state, and
the camera is not attached to the device in the non-stable motion state; and
set, in a stable motion state, a second speed range and a second zoom magnification range as the second control setting for the panorama image capturing operation, wherein
the camera is stably movable in the stable motion state,
the camera is attached to the device in the stable motion state,
the second speed range is wider than the first speed range of the non-stable motion state, and
the second zoom magnification range is wider than the first zoom magnification range.

10. An imaging control method, comprising:

detecting whether a camera is attached to a device;

setting a control setting of a panorama image capturing operation to a first control setting when it is detected that the camera is not attached to the device, wherein the panorama image capturing operation is operated with holding and panning the camera according to a user operation in case the camera is not attached to the device, the control setting of the panorama image capturing operation affects a quality of a panorama image generated by combination of a plurality of images, and the plurality of images being is based on the panorama image capturing operation;

setting the control setting of the panorama image capturing operation to a second control setting when it is detected that the camera is attached to the device such that the panorama image capturing operation is operated by automatically panning the camera by the device, wherein the first control setting is restricted compared to the second control setting;

setting, in a non-stable motion state, a first speed range and a first zoom magnification range as the first control setting for the panorama image capturing operation, wherein the camera is non-stably movable in the non-stable motion state, and the camera is not attached to the device in the non-stable motion state; and setting, in a stable motion state, a second speed range and a second zoom magnification range as the second control setting for the panorama image capturing operation, wherein the camera is stably movable in the stable motion state, the camera is attached to the device in the stable motion state, the second speed range is wider than the first speed range of the non-stable motion state, and the second zoom magnification range is wider than the first zoom magnification range.

11. A non-transitory computer-readable medium having stored thereon computer-executable instructions that, when executed by a processor of an imaging control apparatus, cause the processor to execute operations, the operations comprising:

detecting whether a camera is attached to a device;

setting a control setting of a panorama image capturing operation to a first control setting when it is detected that the camera is not attached to the device, wherein the panorama image capturing operation is operated with holding and panning the camera according to a user operation in case the camera is not attached to the device, the control setting of the panorama image capturing operation affects a quality of a panorama image generated by combination of a plurality of images, and the plurality of images is captured based on the panorama image capturing operation;

setting the control setting of the panorama image capturing operation to a second control setting when it is detected that the camera that is attached to the device such that the panorama image capturing operation is operated by automatically panning the camera by the device, wherein the first control setting is restricted compared to the second control setting;

setting, in a non-stable motion state, a first speed range and a first zoom magnification range as the first control setting for the panorama image capturing operation, wherein the camera is non-stably movable in the non-stable motion state, and the camera is not attached to the device in the non-stable motion state; and setting, in a stable motion state, a second speed range and a second zoom magnification range as the second control setting for the panorama image capturing operation, wherein the camera is stably movable in the stable motion state, the camera is attached to the device in the stable motion state, the second speed range is wider than the first speed range of the non-stable motion state, and the second zoom magnification range is wider than the first zoom magnification range.

12. The imaging control apparatus according to claim 1, wherein the camera generates a control signal for transmission based on a disposition of a subject.

13. The imaging control apparatus according to claim 1, wherein the panorama image capturing operation comprises a first panning operation over a first visual field and a second panning operation over a second visual field, and a first tilt direction for the first panning operation partially overlaps with a second tilt direction for the second panning operation.

* * * * *